(12) United States Patent
Shah et al.

(10) Patent No.: US 11,130,239 B2
(45) Date of Patent: Sep. 28, 2021

(54) METHOD FOR AUTOMATICALLY GENERATING WAYPOINTS FOR IMAGING SHELVES WITHIN A STORE

(71) Applicant: Simbe Robotics, Inc., San Francisco, CA (US)

(72) Inventors: Mirza Akbar Shah, San Francisco, CA (US); Bradley Bogolea, San Francisco, CA (US); Jeffrey Gee, San Francisco, CA (US); Jariullah Safi, San Francisco, CA (US); Luke Fraser, San Francisco, CA (US)

(73) Assignee: Simbe Robotics, Inc., San Francisco, CA (US)

( * ) Notice: Subject to any disclaimer, the term of this patent is extended or adjusted under 35 U.S.C. 154(b) by 18 days.

(21) Appl. No.: 16/513,228

(22) Filed: Jul. 16, 2019

(65) Prior Publication Data

US 2019/0337158 A1    Nov. 7, 2019

Related U.S. Application Data

(63) Continuation of application No. 15/600,556, filed on May 19, 2017, now Pat. No. 10,399,230.

(Continued)

(51) Int. Cl.
*G05D 1/02* (2020.01)
*B25J 11/00* (2006.01)
(Continued)

(52) U.S. Cl.
CPC .......... *B25J 11/008* (2013.01); *B25J 9/1664* (2013.01); *B25J 9/1697* (2013.01); *B25J 13/089* (2013.01);
(Continued)

(58) Field of Classification Search
CPC ...... B25J 9/1697; B25J 9/1664; B25J 13/089; B25J 19/023; G05D 1/0274;
(Continued)

(56) References Cited

U.S. PATENT DOCUMENTS

| | | | |
|---|---|---|---|
| 8,009,864 B2* | 8/2011 | Linaker | G06K 9/00664 |
| | | | 382/103 |
| 10,176,452 B2* | 1/2019 | Rizzolo | G06T 7/73 |

(Continued)

*Primary Examiner* — Dalena Tran
(74) *Attorney, Agent, or Firm* — Run8 Patent Group, LLC; Peter Miller

(57) ABSTRACT

One variation of a method for automatically generating waypoints for imaging shelves within a store includes: dispatching a robotic system to autonomously generating a map of a floor space within the store; accessing an architectural metaspace defining target locations and addresses of the set of shelving structures within the store; distorting the architectural metaspace into alignment with the map to generate a normalized metaspace representing real locations and addresses of the set of shelving structures in the store; defining a set of waypoints distributed longitudinally along and offset laterally from a first shelving structure represented in the normalized metaspace based on a known position of an optical sensor in the robotic system; and dispatching the robotic system to record optical data while occupying the set of waypoints during an imaging routine.

20 Claims, 5 Drawing Sheets

Related U.S. Application Data

(60) Provisional application No. 62/339,047, filed on May 19, 2016, provisional application No. 62/339,039, filed on May 19, 2016, provisional application No. 62/339,045, filed on May 19, 2016.

(51) Int. Cl.

| | |
|---|---|
| *G06Q 20/00* | (2012.01) |
| *B25J 9/16* | (2006.01) |
| *B25J 13/08* | (2006.01) |
| *B25J 19/02* | (2006.01) |
| *G06Q 10/08* | (2012.01) |
| *G06K 9/00* | (2006.01) |
| *G06K 9/20* | (2006.01) |
| *G06K 9/52* | (2006.01) |
| *G06Q 30/02* | (2012.01) |
| *G06T 5/00* | (2006.01) |
| *G06T 7/00* | (2017.01) |

(52) U.S. Cl.
CPC ........ *B25J 19/023* (2013.01); *G06K 9/00671* (2013.01); *G06K 9/2063* (2013.01); *G06Q 10/087* (2013.01); *G06Q 20/00* (2013.01); *B64C 2201/127* (2013.01); *B64C 2201/146* (2013.01); *G06K 9/52* (2013.01); *G06Q 30/0201* (2013.01); *G06T 5/006* (2013.01); *G06T 7/0008* (2013.01)

(58) Field of Classification Search
CPC ......... G05D 2201/0207; G05D 1/0212; G05D 1/0246; Y10S 409/903; G06Q 10/087; G06Q 20/203; G06Q 30/0623; G06K 9/00771; G06K 9/6201; G06K 9/6217
USPC ................... 700/245, 259; 705/28; 345/427; 382/103, 212
See application file for complete search history.

(56) References Cited

U.S. PATENT DOCUMENTS

2003/0154141 A1\* 8/2003 Capazario .............. G06Q 30/02
    705/26.1
2009/0063307 A1\* 3/2009 Groenovelt .......... G06Q 10/087
    705/28

\* cited by examiner

METHOD FOR AUTOMATICALLY GENERATING WAYPOINTS FOR IMAGING SHELVES WITHIN A STORE

CROSS-REFERENCE TO RELATED APPLICATIONS

This Application is a continuation of U.S. patent application Ser. No. 15/600,556, filed on 19 May 2017, which claims the benefit of U.S. Provisional Application No. 62/339,047, filed on 19 May 2016, U.S. Provisional Application No. 62/339,039, filed on 19 May 2016, and U.S. Provisional Application No. 62/339,045, filed on 19 May 2016, all of which are incorporated in their entireties by this reference.

The Application is related to U.S. patent application Ser. No. 15/347,689, filed on 9 Nov. 2016, and to U.S. patent application Ser. No. 15/600,527, filed on 19 May 2017, which are incorporated in their entireties by this reference.

TECHNICAL FIELD

This invention relates generally to the field of stock tracking and more specifically to a new and useful method for automatically generating waypoints for imaging shelves within a store in the field of stock tracking.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
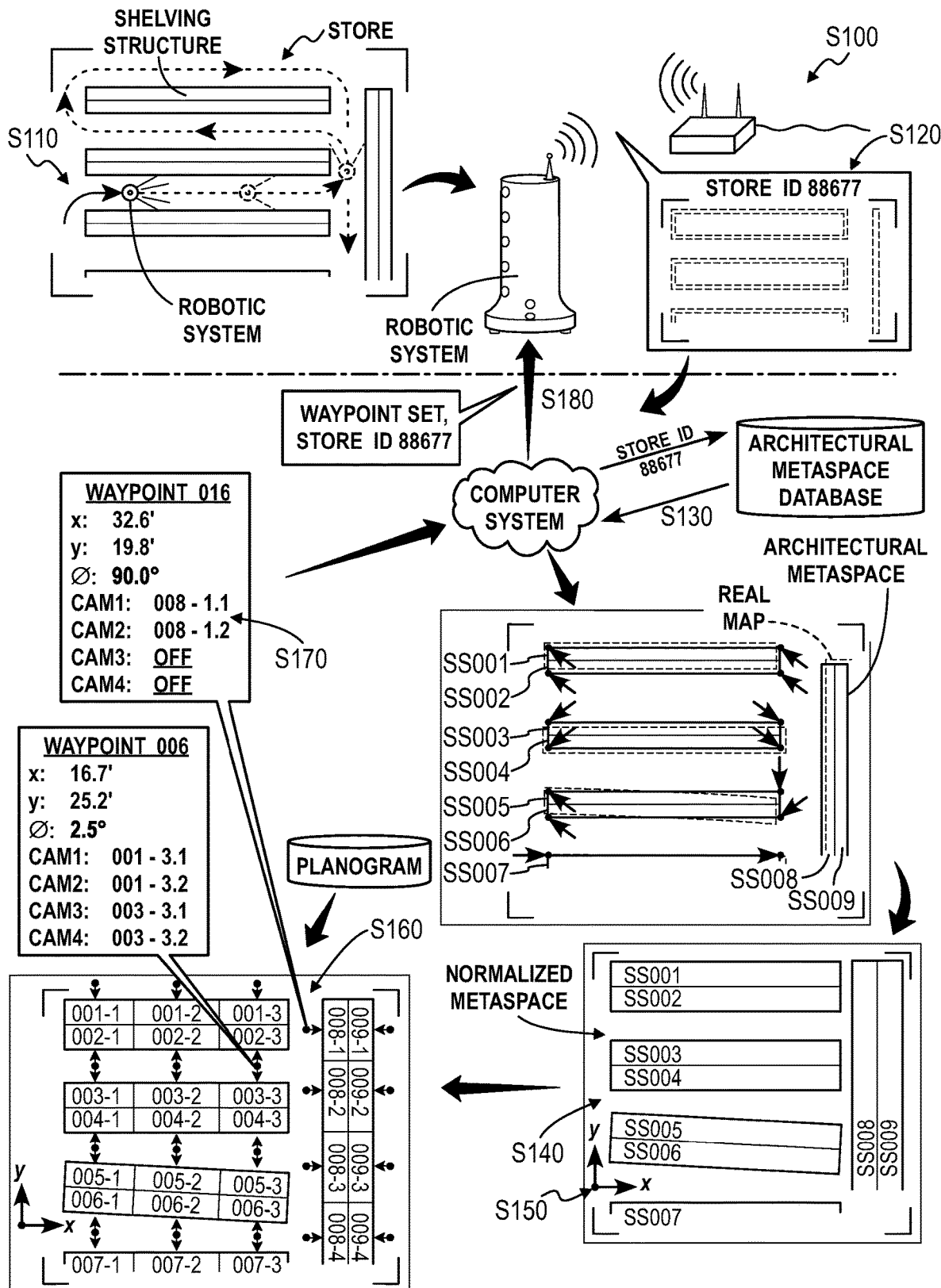
FIG. 1 is a flowchart representation of a method.

As shown in FIG. 1, a method S100 for automatically generating waypoints for imaging shelves within a store includes: dispatching a robotic system to autonomously map a floor space within a store in Block S110; receiving a map of the floor space from the robotic system in Block S120; accessing an architectural metaspace defining locations of shelving structures and addresses of shelving structures within the store in Block S130; generating a normalized metaspace by aligning features in the architectural metaspace to features in the map in Block S140; defining a coordinate system for the store within the normalized metaspace in Block S150; defining a set of waypoints within the normalized metaspace based on positions of shelving structures within the normalized metaspace and imaging capabilities of the robotic system in Block S160, each waypoint including a location and orientation relative to the coordinate system; labeling each waypoint in the set of waypoints with an address of a shelving structure proximal the waypoint in Block S170; and uploading the set of waypoints to the robotic system for execution in a subsequent imaging routine in Block S180.

The method S100 can also include: generating the architectural metaspace in Block S130; labeling shelving structures in the normalized metaspace with addresses of corresponding shelving segments and shelves from a set of preset elevation maps—or "scenes" stored in a planograms of the store—based on shelving structure addresses in the normalized metaspace in Block S142; and labeling a waypoint with an address of a camera in the robotic system scheduled to capture an image and addresses of a shelving structure, a shelving segment, and a shelf anticipated to be in a field of view of the camera when the robotic system is proximal the location and orientation within the store defined in the waypoint in Block S170.

One variation of the method S100 includes: dispatching a robotic system to autonomously collect map data of a floor space within the store during a mapping routine in Block S110; generating a map of the floor space from map data collected by the robotic system during the mapping routine in Block S120; accessing an architectural metaspace defining target locations and addresses of the set of shelving structures within the store in Block S130; distorting features in the architectural metaspace into alignment with like features in the map to generate a normalized metaspace representing real locations and addresses of the set of shelving structures in the store in Block S140; defining a coordinate system within the normalized metaspace in Block S150; defining a set of waypoints within the normalized metaspace relative to the coordinate system in Block S160, the set of waypoints including a first subset of waypoints distributed longitudinally along and offset laterally from a real location of a first shelving structure, in the set of shelving structures, represented in the normalized metaspace, each waypoint in the first subset of waypoints defining an orientation relative to the coordinate system based on a known position of an optical sensor in the robotic system and the real location of the first shelving structure in the normalized metaspace; and dispatching the robotic system to record optical data while occupying each waypoint in the first subset of waypoints during an imaging routine in Block S180.

Another variation of the method S100 includes: dispatching a robotic system to autonomously map a floor space within the store in Block S110; receiving a map of the floor space from the robotic system in Block S120; accessing an architectural metaspace defining locations of shelving structures and addresses of shelving structures within the store in Block S130; generating a normalized metaspace by aligning features in the architectural metaspace to features in the map in Block S140; defining a coordinate system for the store within the normalized metaspace in Block S150; defining a set of waypoints within the normalized metaspace based on positions of shelving structures within the normalized metaspace and imaging capabilities of the robotic system in Block S160, each waypoint including a location and orientation relative to the coordinate system; labeling each waypoint in the set of waypoints with an address of a shelving structure proximal the waypoint in Block S170; and uploading the set of waypoints to the robotic system for execution in a subsequent imaging routine in Block S180. In this variation, the method S100 can also include: accessing a first image including visual data recorded by the robotic system when occupying a first waypoint in the set of waypoints during the imaging routine; detecting a first shelf in the first image; determining an address of the first shelf based on a first address of a first shelving structure associated with the first waypoint and a vertical position of the first shelf within the first image; based on the address of the first shelf, retrieving a first list of products assigned to the first shelf by a planogram of the store; retrieving a first set of template images from a database of template images, each template image in the first set of template images including visual features of a product specified in the first list of products; extracting a first set of features from a first region of the first image adjacent the first shelf; confirming presence of a unit of a first product, in the first list of products, on the first shelf in response to correlation between features in the first set of features and features in a first template image, in the first set of template images, representing the first product; determining that a unit of the first product is improperly stocked on the first shelf in response to deviation between features in the first set of features and features in the first template image; and, in response to determining that the unit of the first product is improperly stocked on the first shelf, generating a first restocking prompt for the first product on the first shelf in Block S190.

2. Applications

Figure 2:
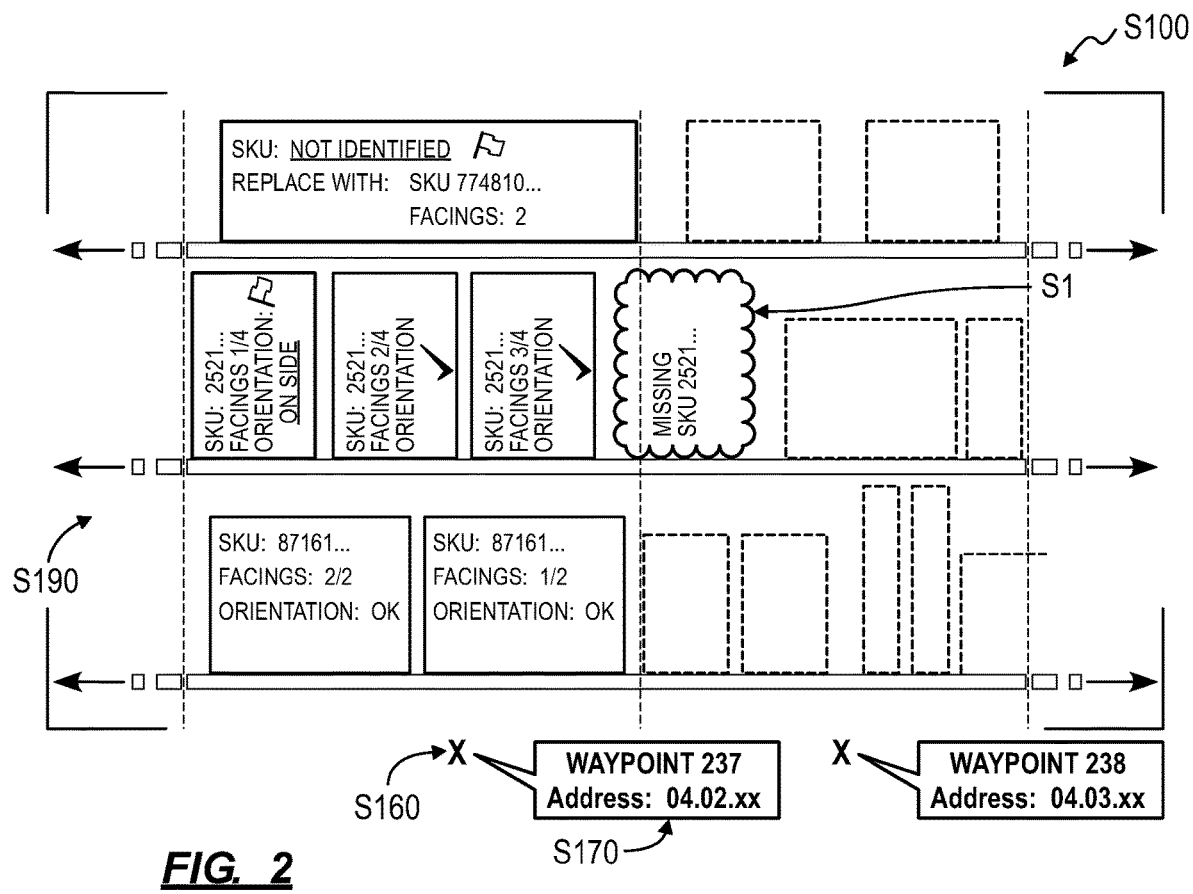
FIG. 2 is a flowchart representation of one variation of the method.

Generally, the method S100 can be executed by a computer system to automatically generate a set of waypoints for a store based on real mapping data collected by a robotic system dispatched to the store, based on stocking data stored in elevation maps or "scenes" of discrete shelving structures defined in a saved planogram or other product position database, and based on imaging capabilities of the robotic system. Upon receipt of these waypoints, the robotic system can sequentially navigate to locations defined in these waypoints, capture one or more images at each of these waypoints, and return these images to the computer system. The computer system can then automatically transform these images into a graph, table, or map of positions of products on shelves throughout the store and deviations from product presentation specifications defined for the store, as shown in FIG. 2.

In particular, the method S100 can be implemented by a local or remote computer system to automatically define and tag waypoints for a store based on a combination of data collected by the robotic system and preexisting data defining the layout of shelves and/or products within the store. For example, for a small store stocked with 1,000 unique products (i.e., 1,000 unique stock keeping units, or "SKUs"), the system can automatically generate 20 unique waypoints for a robotic system navigating through the store to collect images of products stocked on shelves in the store. In this example, for the robotic system that includes four cameras, as described below, the robotic system can collect up to 80 images of shelves in the small store (i.e., four images per waypoint) during a imaging routine, and the computer system can transform these images into a map of products within the small store and deviations from product presentation requirements predefined for the store. However, for a store of moderate size stocked with 25,000 unique products (i.e., 25,000 unique SKUs), the system can automatically generate 200 unique waypoints for the store, and the robotic system including four cameras can capture up to 800 images of shelves within the store. Furthermore, for a large store stocked with 150,000 unique products, the system can automatically generate 500 unique waypoints for the store, and the robotic system including four cameras can capture up to 2,000 images of shelves within the store.

For example, the robotic system can be placed within a retail store (or warehouse, etc.), and the remote computer system (e.g., a remote server connected to the robotic system via the Internet) can dispatch the robotic system to collect images at waypoints throughout the retail store outside of store hours, such as every night beginning at 1 AM. The robotic system can thus complete a imaging routine before the retail store opens a few hours later. Furthermore, the system can process images collected during the imaging routine to generate a graph, map, or table of current product placement on shelves in the store and/or to generate a task list of misplaced or misoriented products to correct, and the system can present this graph, map, table, and/or task list to employees upon their arrival at the retail store the next morning before the retail store opens. Alternatively, the remote computer system can dispatch the robotic system to waypoints within the store during store hours and can process images received from the robotic system substantially in real-time to generate current such graphs, maps, tables, and/or task lists in near-real-time.

The method S100 can be executed when the robotic system is provisioned to a new store or retrofit to an existing store. For example, the computer system can aggregate an architectural plan for the store (or a generic store layout assigned to the store) and a set of elevation maps for the store into an architectural metaspace defining anticipated positions of shelving structures, shelving segments, and/or shelves—of known addresses—within the store. However, because real positions of shelving structures and shelving segments (and aisles, walls, columns, etc.) in the store may differ from positions represented in the architectural metaspace, the computer system can collect real floor layout data for the store through the robotic system and align features within the architectural metaspace to these real floor layout data. Once the architectural metaspace is transformed into a normalized metaspace representative of real positions of shelving structures and shelving segments, etc. within the store, the system can generate a set of waypoints that each define a target location and orientation for the robotic system and address one or more cameras within the robotic system through which the robotic system is to record photographic images when occupying the waypoint. The method S100 can be similarly executed after a store is renovated or after permanent or temporary shelving structures are moved within the store in order to recalculate waypoints for the store.

Therefore, the system can implement Blocks of the method S100 to: collect map data representing true locations of objects within a store; access an architectural (or similar) plan specifying target or planned locations of these objects within the store and containing links to a planogram of the store; and merge the map and the architectural plan to create a normalized metaspace that represents accurate locations of known, addressed objects (e.g., shelving structures, shelving segments, etc.) within the store. The system can then define a set of waypoints that—when occupied by the robotic system to within a threshold linear and angular tolerance—locate shelves, shelving segments, and shelving structures throughout the store in regular, repeatable positions in the fields of view of cameras integrated into the robotic system. The system can thus: automatically generate a set of waypoints linked to elevation maps of shelving structures in a planogram of the store; while also compensating for deviations from an original layout plan for the store and achieving a high degree of precision (i.e., accuracy and repeatability) in images of shelves, shelving segments, and shelving structures recorded by the robotic system when executing an imaging routine; and while further reducing or eliminating human supervision or human labeling of objects represented in the map (e.g., entry of addresses of shelving structures represented in the map). By executing the method S100 to thus define a set of waypoints for the store with limited or no human supervision, the system can achieve relatively rapid onboarding and provisioning of the robotic system to the store, achieve a high quality of images of shelves, shelving segments, and shelving structures, etc. recorded by the robotic system, and achieve a high degree of confidence in the accuracy of a stocking condition of the store based on data extracted from these images.

3. Robotic System

A robotic system executes Blocks S110 and S112 of the method S100 to navigate to a waypoint and to capture images of shelves in the store. Generally, the robotic system can define a network-enabled mobile robot that can autonomously traverse a store, capture images of shelves within the store, and upload those images to a remote computer system for analysis.

Figure 3:
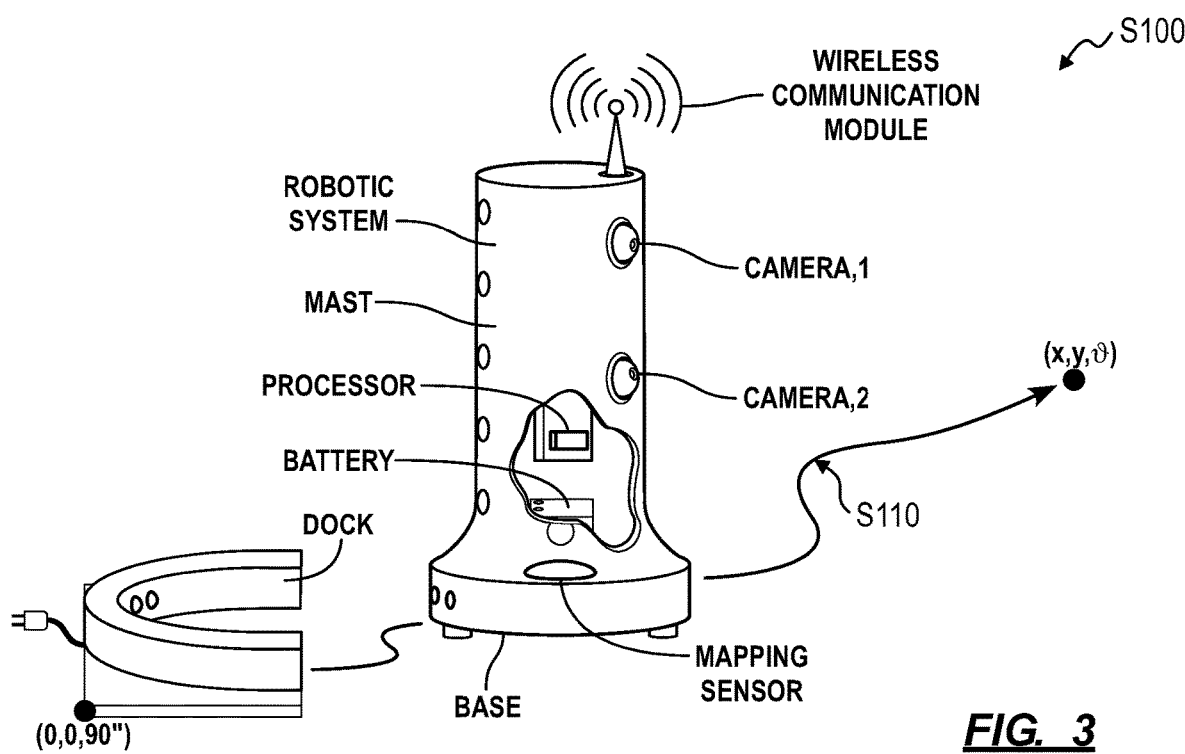
FIG. 3 is a flowchart representation of one variation of the method.

In one implementation, the robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems); a processor that transforms data collected by the mapping sensors into two- or three-dimensional maps of a space around the robotic system; a mast extending vertically from the base; a set of cameras arranged on the mast; a geospatial position sensor (e.g., a GPS sensor); and a wireless communication module that downloads waypoints and a master map of a store from a remote computer system (e.g., a remote server) and that uploads photographic images captured by the camera and maps generated by the processor to the remote computer system, as shown in FIG. 3. In this implementation, the robotic system can include cameras mounted statically to the mast, such as two vertically offset cameras on a left side of the mast and two vertically offset cameras on the right side of mast, as shown in FIG. 3. The robotic system can additionally or alternatively include articulable cameras, such as: one camera on the left side of the mast and supported by a first vertical scanning actuator; and one camera on the right side of the mast and supported by a second vertical scanning actuator. The robotic system can also include a zoom lens, a wide-angle lens, or any other type of lens on each camera. However, the robotic system can define any other form and can include any other subsystems or elements supporting autonomous navigating and image capture throughout a store environment.

The system can also include multiple robotic systems placed in a single store and configured to cooperate to image shelves within the store. For example, two robotic systems can be placed in a large single-floor retail and can cooperate to collect images of all shelves in the store within a threshold period of time (e.g., within one hour). In another example, one robotic system can be placed on each floor of a multi-floor store, and each robotic system can each collect images of shelves on its corresponding floor. The remote computer system can then aggregate images captured by multiple robotic systems placed in one store to generate a graph, map, table, and/or task list of properly- and improperly-stocked slots within the store.

4. Hierarchy and Terms

A "product facing" is referred to herein as a side of a product (e.g., of a particular SKU or other product identifier) designated for a slot. A "planogram" is referred to herein as a graphical representation of multiple product facings across each of multiple shelving structures within a store (e.g., across an entire store). Product identification, placement, and orientation data recorded visually in a planogram can be also be recorded in a corresponding textual product placement spreadsheet, slot index, or other store database (hereinafter a "product placement database").

A "slot" is referred to herein as a section of a shelf designated for occupation by one product facing, including a row of one or more units of a product. A "shelf" is reference herein as one lateral surface (e.g., one four-foot-wide horizontal surface) spanning one or more slots. A "shelving segment" is referred to herein as one column of a shelving structure, including one or more shelves. A "shelving structure" is referred to herein as a row of one or more shelving segments. An "aisle" is referred to herein as a thoroughfare between two opposing shelving structures. A "store" is referred to herein as a (static or mobile) facility containing one or more shelving structures and one or more aisles.

A "product" is referred to herein as a type of packaged good associated with a particular product identifier (e.g., a SKU). A "unit" or "product unit" is referred to herein as an instance of a product, such as one packaged article in a series of packaged articles associated with one SKU value.

The method S100 is described herein as executed by a remote computer system (e.g., a remote server, hereinafter a "computer system"). However, Blocks of the method S100 can be executed by one or more robotic systems placed in a retail space (or store, warehouse, etc.), by a local computer system, or by any other computer system—hereinafter a "system."

Furthermore, Blocks of the method S100 are described below as executed by the system to identify products stocked on open shelves on shelving structures within a store. However, the system can implement similar methods and techniques to identify products stocked in cubbies, in a refrigeration unit, on a wall rack, in a freestanding floor rack, on a table, or on or in any other product organizer in a retail space.

5. Robotic System Provisioning

Block S110 of the method S100 recites dispatching a robotic system to autonomously collect map data of a floor space within the store during a first mapping routine. Generally, in Block S110, the system triggers a robotic system to autonomously navigate through the store and to generate a 2D map of the floor space within the store (and/or to generate a 3D map of the interior volume of the store).

In one implementation, once the robotic system is powered on in a store following initial placement in the store, the system can serve a prompt to the robotic system in Block S110, such as via a computer network (e.g., the Internet), to initiate a mapping routine. For example, the robotic system can immediately initiate a mapping routine upon receipt of the prompt from the system, or the robotic system can queue the mapping routine for a subsequent scheduled scan time, such as at 2 AM when the store is closed or (substantially) unoccupied. Alternatively, the robotic system can automatically initiate a mapping routine when first powered on within the store or in response to a manual input from a user, such as manual selection of a "Start" button on the robotic system or within an operator portal executing on a mobile computing device and affiliated with the store or the robotic system.

In another implementation, the system dispatches the robotic system to execute a first mapping routine within the store following initial delivery of the robotic system to the store and in response to receipt of confirmation of a preferred stocking condition currently present in the store. For example, in preparation for autonomous generation of a new planogram for the store, associates of the store can manually stock each slot, shelf, shelving segment, shelving structure, cubby, refrigeration unit, wall rack, freestanding floor rack, and/or table, etc. throughout the store with preferred numbers and orientations of various products; once the robotic system is provisioned to the store and connected to a local wireless network within the store, a human operator (e.g., a manager of the store or entity affiliated with the robotic system) can access an operator portal through a computing device (e.g., a desktop computer or smartphone, etc.), confirm the current state of the store fulfills a (approximately) desired stocking condition, and then select a function to generate a new planogram of the store according to the current stocking condition. Upon receipt of confirmation of the desired stocking condition and the new planogram function, the system can initiate execution of the method S100 by first dispatching the robotic system to collect map data of the store and/or to generate a map of the store in Block S110. However, the system can implement any other method or technique in Block S110 to trigger the robotic system to execute a mapping routine.

In yet another implementation, the system executes Block S110 in response to indication of a change to the layout of the store entered through an operator portal, such as by a manager of the store through a web browser or native application executing on a desktop computer, mobile computing device, or other device. In particular, following rearrangement of all or a subset of shelving structures, placement of new shelving structures, and removal of existing shelving structures—such as intransient (e.g., fixed-infrastructure) shelving structures and/or temporary shelving structures (e.g., freestanding cardboard popups)—the system can execute Block S110 to initiate generation of a new normalized metaspace and new set of waypoints that accommodate changes to the layout of the store. Therefore, in this implementation, the system can: generate a normalized metaspace that represents such a change to the store layout; and then define a set of waypoints according to this change to the store layout represented in the normalized metaspace.

Once triggered to execute a mapping routine by the system (e.g., the computer system) in Block S110, the robotic system can autonomously navigate through the store while recording distance data through its integrated mapping sensors and generating a 2D (or 3D) map of the physical interior space of the store. For example, the robotic system can implement simultaneous localization and mapping (or "SLAM") techniques to construct and update a map of an unknown environment within the store while also tracking its location within the map based on LIDAR-based distance scans collected throughout the mapping routine. However, the robotic system can implement any other methods or techniques to generate a 2D map of the floor space within the store (or to generate a 3D map of the interior of the store).

Alternatively, the robotic system can collect raw map data during a mapping routine and upload these data to the system (e.g., a remote server, such as via the Internet) in real-time during the mapping routine or upon conclusion of the mapping routine. The system can then implement similar methods and techniques to reconstruct these raw map data into a 2D floor plan or 3D map (e.g., a point cloud) of the store (hereinafter a "floor map") remotely from the robotic system, as described below.

5.1 Multiple Robotic Systems

In one variation, the system includes multiple robotic systems that are provisioned to a single store, cooperate to collect map data during a mapping routine and cooperate to collect images during an imaging routine, such as by autonomously executing assigned subsets of waypoints defined for the store. For example, two robotic systems can be placed in a large single-floor retail store and can cooperate to collect map data and images of all shelves in the store within mapping and imaging routines of limited duration (e.g., less than one hour). In another example, one robotic system can be placed on each floor of a multi-floor store, and each robotic system placed in the store can collect map data and images of shelves on its assigned floor. Following mapping routines by these robotic systems within the store, the system can collect map from these robotic systems in Block S120 and then implement methods and techniques described herein to generate one set of waypoints per robotic system provisioned to the store 6. Real Floor Map Block S120 of the method S100 recites receiving a map of the floor space from the robotic system. Generally, in Block S120, the system functions to collect a 2D map of the floor space of the store (or a 3D map or point cloud of the interior of the store) from the robotic system following completion of the mapping routine described above. For example, upon completion of the mapping routine, the robotic system can upload the map to the system via a local Internet-connected wireless router or via a cellular network. However, the system can collect a map of real locations of obstacles and structures within the store in any other way and in any other format.

In one implementation shown in FIG. 1, the robotic system generates a 2D point cloud of the store at one horizontal plane offset above the floor of the store (e.g., two inches above the floor of the store) and uploads this point cloud to the system in Block S120. In this implementation, the system can then implement line extraction techniques to transform the 2D point cloud into a vectorized 2D line map representing real (e.g., dimensionally-accurate) positions and external dimensions of structures arranged on the floor throughout the store. The system can then implement pattern matching, structure recognition, template matching, and/or other computer vision techniques to identify large, discrete, (approximately) rectilinear regions in the vectorized 2D line map as shelving structures (and/or other storage elements) in the store and then label the vectorized line map (hereinafter a "floor map") accordingly in Block S120.

In one example, the system can: label a discrete rectangular structure exhibiting a maximum horizontal dimension greater than one meter and exhibiting an aspect ratio greater than 2:1 as a shelving structure; label a discrete rectangular structure exhibiting a maximum horizontal dimension greater than one meter and exhibiting an aspect ratio less than 2:1 as an open table; label a discrete rectangular structure exhibiting a maximum horizontal dimension less than one meter and exhibiting an aspect ratio less than 2:1 as a freestanding popup unit; label a discrete amorphous structure exhibiting a maximum horizontal dimension less than one meter and exhibiting an aspect ratio less than 2:1 as a freestanding floor unit; etc. In another example, the system can: access a database of standard plan dimensions (e.g., length and width) and geometries (e.g., rectangular) of shelving structures, checkout lanes, refrigeration units, etc. common to retail settings; extract dimensions and geometries of structures on the floor of the space from the 2D line map; and compare these structure dimensions and geometries to standard plan and geometry definitions stored in the database to identify and label select structures represented in the 2D line map as shelving structures.

In another example, the system can implement edge detection techniques to scan a single horizontal plane in the floor map for ~90° corners, identify a closed region in the floor map bounded by a set of four ~90° corners as a shelving structure, and identify an open area between two such shelving structures as an aisle; the system can then populate the floor map with labels for shelving structures and aisles accordingly. However, the system can implement template matching, edge detection, pattern matching, pattern recognition, optical character recognition, color recognition, content-based image retrieval, pose estimation, code reading, shape recognition, and/or any other suitable method or processing technique to identify features in the floor map and to correlate these features with one or more shelving structures within the store.

6.1 Supervised Shelving Structure Detection

In the foregoing implementation, once the system identifies shelving structures represented in a floor map of the store, the system can prompt a human operator (e.g., a robotic system operator, a manager of the store) to confirm shelving structure labels autonomously applied to the floor map. For example, the system can serve a visual form of the floor map to the operator through the operator portal executing on the operator's mobile computing device or desktop computer and render shelving structure labels over the visual form of the floor map; the operator can then manually review and adjust these shelving structure labels, thereby providing supervision to the system in identifying shelving structures throughout the store, such as prior to generation of waypoints for an upcoming imaging routine. Alternatively, the system can transform map data received from the robotic system into a vectorized floor map (e.g., a vectorized 2D or 3D line map) of the store, identify discrete structures arranged on the floor of the store within the floor map, and serve this floor map with discrete structures highlighted within the floor map to the operator portal; the operator can then manually confirm that structures highlighted in the floor map represent shelving structures through the operator portal. However, the system can interface with a human operator through the operator portal in any other way to collect information confirming identification of shelving structures or identifying shelving structures directly in the floor map of the store.

However, the system can implement any other method or technique to transform raw map data (or a vectorized 2D or 3D line map) collected by the robotic system into a labeled floor map identifying known locations of shelving structures (and/or other storage elements) within the store, such as relative to a coordinate system described below.

7. Architectural Metaspace

Block S130 of the method S100 recites accessing an architectural metaspace defining locations of shelving structures and addresses of shelving structures within the store. Generally, in Block S130, the system retrieves an existing architectural metaspace that defines a planned location of shelving structures within the store and includes shelving structure addresses or other identifiers that link these shelving structures to preexisting elevation maps of shelving structures throughout the store, wherein these preexisting elevation maps together define a planogram of the store.

7.1 Architectural Plan

In one implementation, the system generates the architectural metaspace for the store in Block S130 by linking (or merging) an existing architectural plan for the store and preexisting shelving structure elevation maps for the store, as shown in FIG. 1. In one example, a user (e.g., an employee of the store, a robotic system operator) uploads a digital copy of a 2D architectural plan of the store—such as including positions of walls, shelves, columns, doors, etc. within the store—through an operator portal executing with a browser or native application running on a computing device (e.g., a desktop computer). In this example, the system can access a digital scan of paper blueprints uploaded by the user and then vectorize this digital scan. In another example, the system can retrieve an existing vectorized architectural plan for the store from an Internet link—supplied by the user through the operator portal—to an online data store.

Alternatively, the system can retrieve a standardized store layout (e.g., from a set of standardized store layouts for a particular chain of stores), generally defining an architectural layout of shelving structures, kiosks, checkout counters, doors, etc. within the store. In this implementation, the system can prompt the user to identify areas within the standardized store layout that differ significantly from a real layout of the store, such as missing or added shelving structures, placement of structural columns, etc.; and the system can update the standardized store layout for the store accordingly.

The system can then implement template matching, edge detection, pattern matching, pattern recognition, optical character recognition, color recognition, content-based image retrieval, pose estimation, code reading, shape recognition, and/or any other suitable method or processing technique to identify features in the vectorized architectural plan (or vectorized standardized store layout) as shelving structures, such as described above for the map of the store. (Hereinafter, such features in the architectural plan and metaspaces corresponding to real shelving structures in the store are referred to as "virtual shelving structures.")

7.2 Planogram and Elevation Maps

The system can similarly access a preexisting planogram that visually, graphically, and/or textually defines relative positions of shelving segments and shelves, defines arrangements of products on these shelves, and contains addresses of these shelves, shelving segments, and shelving structures, etc. within shelving structures throughout the store. In one implementation, the system selects a set of elevation map—from the predefined planogram for the store—current as of the time the robotic system generated the real map of the store. Alternatively, the system can access these data from a product position database, such as in the form of a textual spreadsheet. However, the system can collect or retrieve such product location and assignment data for the store in any other format.

7.3 Virtual Shelving Structures in the Architectural Metaspace

The system can then initiate the architectural metaspace by transferring virtual shelving structures, virtual shelving segments, virtual aisles, virtual walls, virtual doors, and/or other virtual features from the vectorized architectural plan into a new vectorized line map defining an architectural metaspace for the store. The system can then link preexisting elevation maps—from the planograms—to corresponding virtual shelving structures in the architectural metaspace.

In one implementation, the system detects features in the vectorized architectural plan that represent addresses or other identifiers of shelving structures in the store. For example, the system can implement optical character recognition to read a shelving structure address directly from text in the architectural plan and can then label virtual shelving structures in the architectural metaspace with these shelving structure addresses based on proximity of a string of recognized text to a virtual shelving structure in the architectural plan. (The system can similarly recognize addresses of shelving segments, aisles, walls, doors, etc. in the architectural plan and write these addresses to corresponding features in the architecture metaspace.) For each virtual shelving structure in the architectural metaspace, the system can match a shelving structure address from a virtual shelving structure to a shelving structure address associated with a planogram—in the set of elevation maps for the store—and then write a planogram ID to the virtual shelving structure in the architectural metaspace. The system can thus link a planogram to a virtual shelving structure in the architectural metaspace based on like shelving structure address tags.

In another implementation, the planogram can also include a planogram layout linking elevation maps of shelving structures throughout the store to relative locations of these shelving structures within the store. The system can thus distort (e.g., rotate, translate, globally skew, locally skew, or otherwise manipulate) the planogram layout to align locations of these elevation maps to virtual shelving structures identified in the architectural metaspace; and then transfers elevation map identifiers from the planogram layout onto coinciding virtual shelving structures in the architectural metaspace.

In the foregoing implementations, the system can also identify virtual aisles between virtual shelving structures within the architectural metaspace and determine an orientation of a planogram—linked to a virtual shelving structure in the architectural metaspace—that faces the planogram toward the adjacent aisle. However, the system can implement any other method or technique to link an existing planogram for the store to a virtual shelving structure in the architectural metaspace 7.4 Virtual Shelving Segments in the Architectural Metaspace For a virtual shelving structure represented in the architectural metaspace, the system can delineate shelving segments along the virtual shelving structure by mapping absolute or relative positions of shelving segments defined in a planogram matched to the virtual shelving structure, as described above. In one example, the system: extracts absolute or relative dimensions of shelving segments and addresses of shelving segments from a planogram; maps these shelving segment dimensions to a corresponding virtual shelving structure in the metaspace to define positions of virtual shelving segments along the virtual shelving structure; and then label each shelving segment in the virtual shelving structure in the architectural metaspace with a corresponding address from the planogram. In another example, the system can: transform a 2D planogram into a 1D set of lines representing relative positions of shelving segments within a shelving structure and label these lines with corresponding shelving segment addresses; anchor one end of the 1D line set to an end of the virtual shelving structure in the metaspace and skew the 1D line set to terminate on an opposite end of the virtual shelving structure; define virtual shelving segments within the virtual shelving structure in the architectural metaspace according to these overlaid lines in the 1D line set; and write the shelving segments addresses from these overlaid lines in the 1D line set to corresponding virtual shelving segments thus defined for the virtual shelving structure in the architectural metaspace. In yet another example, the system can: retrieve a standard shelving segment width (e.g., 4 feet) for the store; delineate virtual shelving segments within the virtual shelving structure based on this standard shelving segment width; and transfer shelving segment addresses from nearest shelving segments defined in an existing planogram—matched to the virtual shelving structure—to these virtual shelving segments within the virtual shelving structure.

The system can then repeat any one or more of these processes for each virtual shelving structure in the architectural metaspace. However, the system can implement any other methods or techniques to link an existing planogram to a virtual shelving structure in the metaspace, to define shelving segments in the virtual shelving structure from shelving segment dimensions and positions defined in an existing planogram, and to label subregions of virtual shelving segments in the architectural metaspace with shelving segment addresses from an existing planogram (or product position database, etc.).

The system can also implement similar methods and techniques to label subregions of virtual shelving segments in the metaspace with shelf addresses and vertical locations of shelves extracted from the set of elevation maps. For example, the system can label each shelving segment in the metaspace with a total height, a number of shelves contained in the shelving segment, and/or vertical positions of shelves in the shelving segment, etc. The system can also label the architectural metaspace with category addresses, aisle addresses, and/or slot addresses extracted from the set of elevation maps.

The system can therefore aggregate data from an architectural plan (or standardized store layout) and preexisting planograms from the store to form an architectural metaspace for the store, such as including a vectorized 2D line map indicating anticipated positions and addresses of shelving structures and shelving segments within the store. The architectural metaspace can thus define a "planned" representation of the store, such as including planned locations and dimensions of aisles, shelving structures, shelving segments, etc. within the store, etc.

7.5 Manual Shelving Structure Identification

The system can additionally or alternatively interface with a user (e.g., an employee of the store or a robotic system operator) to identify and label shelving structures in the architectural plan. In one example, the system interfaces with the operator portal to present the (vectorized) architectural plan to the user. In this example, the user can indicate regions within the architectural plan that correspond to shelving structures, such as by dragging a cursor over shelving structures shown in the architectural plan. Thus, as the user draws a contiguous cursor input over a region in the architectural plan, the system can select a set of lines within the architectural plan that completely bounds this contiguous cursor input and then label this set of lines at a shelving structure. In this example, the user can also tag or label shelving structures in the architectural plan, such as by entering textual shelving structure addresses over identified shelving structures in the architectural plan. Furthermore, the system can interface with the operator portal to collect user inputs identifying and labeling categories, aisles, shelving segments, and/or shelves, etc. within the architectural plan.

The system can implement similar methods and techniques to prompt a user (e.g., an operator or manager of the store) to manually provide shelving structure addresses for a subset of shelving structures represented in the architectural plan, such as for shelving structures—represented in the architectural plan—for which low confidence in accuracy of extracted addresses was calculated.

The system can thus access or initiate the architectural metaspace that includes a set of lines corresponding to user-confirmed shelving structures and user-supplied shelving structure addresses. As described above, the system can then transfer data from a preexisting planogram of the store into the architectural metaspace, such as shelving segment locations and addresses and shelf locations and addresses, based on like shelving structure addresses tagged to virtual shelving structures in the architectural metaspace and to the planogram of the store. However, the system can implement any other method or technique to identify aisles, shelving structures, shelving segments, and/or shelves, etc. within the architectural metaspace and to label these virtual elements with corresponding addresses, IDs, or other pointers to data stored in the planogram or a product position database for the store.

7.6 Preexisting Architectural Metaspace

Alternatively, the system can access a preexisting architectural metaspace, such as uploaded by a user through an instance of the operator portal executing on a desktop computer or other computing device. However, the system can implement any other method or technique to generate or access an architectural metaspace for the store.

8. Normalized Metaspace

Block S140 of the method S100 recites generating a normalized metaspace by aligning features in the architectural metaspace to features in the (real) map. Generally, in Block S140, the system aligns virtual elements within the architectural metaspace to real features within the real map of the store—collected from the robotic system in Block S120—thereby transforming the architectural metaspace into a normalized metaspace containing labeled elements representing real positions of aisles, shelving structures, and/or shelving segments, etc. within the store. In particular, the robotic system (or the computer system) calculates the real map from scan data collected by the robotic system navigating through the store, and the real map therefore represents a true layout of the store, including real deviations from a unique architectural plan or from a standardized layout for the store, such as: real gaps between shelving structures; misalignment of adjacent shelving structures; omitted or added shelving structures and shelving segments; positions of real structural elements (e.g., columns) within the store; etc.

The system can employ the real map as a master layout for the store and align features in the architectural metaspace to features in this master layout to form the normalized metaspace such that waypoints generated from the normalized metaspace in Block S160 are located according to true positions of shelving structures, shelving segments, etc. in the store rather than approximate positions of shelving structures, shelving segments, etc. as defined in an architectural plan or architectural metaspace. Therefore, in Block S140, the system can generate a normalized metaspace representing real gaps between shelving structures, misalignment of adjacent shelving structures, shelving structures in the store omitted from the architectural plan, shelving structures in the store added over the architectural plan, and positions of shelving segments within the store, etc.

In one implementation, the system scales and rotationally aligns the architectural metaspace to the real map by matching large or "global" features (clusters of shelving structures, doors, perimeter walls, etc.) in the architectural metaspace to like features in the real map. The system then: associates virtual shelving structures identified in the architectural metaspace with features (e.g., lines, lines of adjacent points) in the real map based on positional and geometric similarities; and locally skews, scales, rotates, translates, or otherwise modifies line vectors representing shelving structures in the architectural metaspace to locally align with associated features (e.g., lines, lines of adjacent points) in the real map, as shown in FIG. 1, thereby transforming the architectural metaspace into a normalized metaspace containing a vectorized line map representing real locations of shelving structures within the store and labeled with addresses of shelving structures, shelving segments, etc. linking such features to a preexisting planogram (or a product position database) for the store.

For example, the system can: detect shelving structures represented in the map in Block S120, as described above; detect shelving structures represented in the architectural metaspace in Block S130, as described above; and then calculate a transform that approximately centers shelving structures detected in the map onto shelving structures detected in the architectural metaspace in Block S140. By then applying the transform to shelving structures and to locations of shelving structure addresses in the architectural metaspace, the system can generate the normalized metaspace.

In the foregoing example, the system can: access a standardized store layout—for a retail brand associated with the store—defining generic target locations of shelving structures in stores associated with the retail brand; detect shelving structures represented in the standardized store layout in Block S130; and then calculate the transform that approximately centers a first subset of shelving structures detected in the map to a first subset of shelving structures detected in the standardized store layout (e.g., with greater than a threshold confidence that such features represent shelving structures) in Block S140. The system can then initialize the normalized metaspace with locations and addresses of the first subset of shelving structures by applying the transform to the architectural metaspace. However, the system can also identify a second subset of shelving structures in the map that deviate from locations of nearest shelving structures in the standardized store layout by more than a threshold distance or that are not matched to shelving structures in the standardized store layout with more than a threshold degree of confidence. The system can then prompt a user to manually link the second subset of shelving structures in the map to a second subset of shelving structures in the standardized store layout, to provide addresses for these unknown shelving structures, and/or to mark some or all of these shelving structures as not needed or not representative of shelving structures. Finally, the system can: insert the second subset of shelving structures (or remaining unknown shelving structures) in the map into the normalized metaspace; write addresses from the second subset of shelving structures in the architectural metaspace onto the second subset of shelving structures in the normalized metaspace based on manual links provided by the user; and/or write addresses to the shelving structures as provided manually by the user.

The system can implement similar methods and techniques to: associate virtual shelving segments identified and labeled in the architectural metaspace with features in the real map; and locally skew, scale, rotate, translate, or otherwise modify line vectors representing shelving segments in the architectural metaspace to locally align with associated features in the real map in order to transform the architectural metaspace into a normalized metaspace.

The system can therefore relate labeled features in the architectural metaspace to features in the real map, locally reposition labeled features in the architectural metaspace to align with related features in the real map to generate a normalized metaspace in Block S140, and transfer shelving structure addresses (i.e., labels), shelving segment addresses, etc. from the architectural metaspace to the normalized metaspace in Block S140. However, the system can implement any other method or technique to transform the labeled architectural metaspace into a normalized metaspace that represents real positions of known shelving structures (and/or other elements) within the store.

9. Store Coordinate System

Block S150 of the method S100 recites defining a coordinate system for the store within the normalized metaspace. Generally, in Block S150, the system locates a coordinate system within the normalized metaspace in preparation to calculate lateral distances, longitudinal distances, and orientations (e.g., yaw angle) for waypoints relative to a coordinate system in Block S160.

In one implementation, the system labels a location of the dock—placed in the store—in the normalized metaspace based on position data received from the robotic system in Block S120 and then defines an origin of the coordinate system that coincides with the dock in the normalized metaspace. In this implementation, the system then aligns an x-axis of the coordinate system to a longest linear wall identified in the normalized metaspace. However, the system can locate and position a coordinate system within the normalized metaspace in any other way or according to any other parameters.

10. Waypoint Generation

Figure 6:
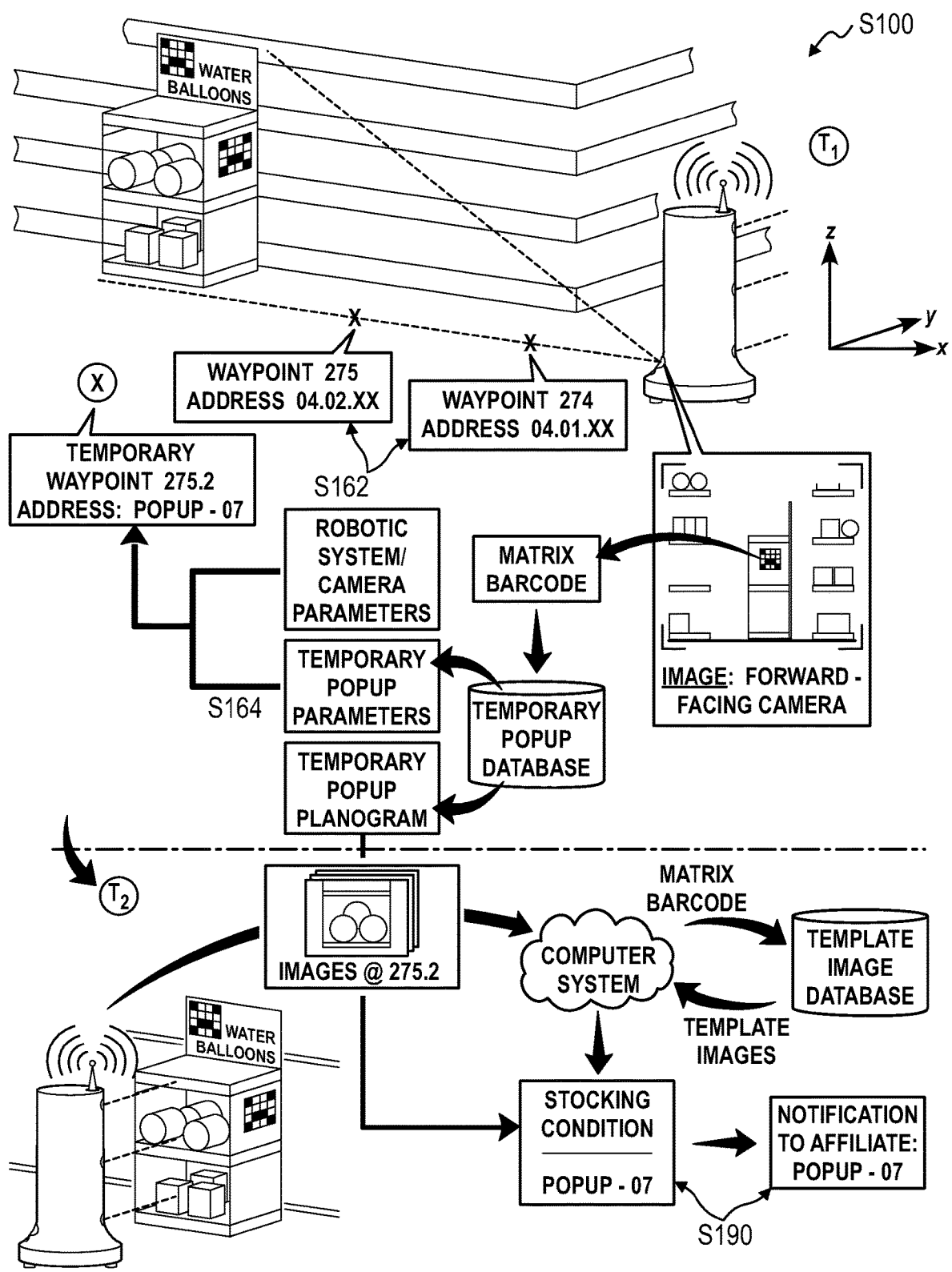
FIG. 6 is a flowchart representation of one variation of the method.

Block S160 of the method S100 recites defining a set of waypoints within the normalized metaspace based on positions of shelving structures within the normalized metaspace and imaging capabilities of the robotic system, wherein each waypoint defines a location and orientation relative to the coordinate system; and Block S110 of the method S100 recites labeling each waypoint in the set of waypoints with an address of a shelving structure proximal the waypoint. Generally, in Block S160, the system generates a list of waypoint defining positions within the store—relative to the coordinate system—at which the robotic system is to navigate and capture digital photographic images based on positions of labeled shelving structures shown in the normalized metaspace, as shown in FIGS. 1 and 6. In Block S170, the system writes addresses of shelving structures or shelving segments, etc. expected to be in the field of view of a camera in the robotic system at each waypoint based on addresses of nearby shelving structures or shelving segments, etc. shown in the normalized metaspace.

In one implementation, the system generates one waypoint for each shelving segment labeled in the normalized metaspace. For example in Block S160, the system can: access—from a planogram of the store—a first elevation map associated with a first address of the first shelving structure, the first elevation map specifying locations of product facings assigned to a first side of the first shelving structure; extract locations of a first set of shelving segments in the first shelving structure from the first elevation map; and project locations of the first set of shelving segments onto the location of the first shelving structure in the normalized metaspace to locate shelving segments in the first shelving structure in the normalized metaspace. In this example, the system can then define waypoints longitudinally centered between each shelving segment in the first shelving structure represented in the normalized metaspace; and calculate an angular orientation (e.g., yaw angle) normal to a longitudinal face of the first shelving structure, relative to the coordinate system, in the normalized metaspace; and write the angular orientation to each waypoint in the first subset of waypoints. Therefore, for each waypoint, the system centers a waypoint in between a corresponding shelving segment in a shelving structure represented in the normalized metaspace such that the shelving segment is centered laterally in the field of view of a camera in the robotic system when the robotic system has navigated to a location and orientation—relative to the coordinate system—defined by the waypoint.

In this implementation, the robotic system can include a set of cameras arranged on one side of its mast; and the system can access a preset target imaging distance for cameras in the robotic system and then define waypoints along a shelving structure represented in the normalized metaspace such that each camera in the robotic system is offset from the face of an adjacent shelving structure by this preset target imaging distance when occupying locations and orientations defined by these waypoints.

Alternatively, the system can retrieve optical capabilities of cameras in the robotic system (e.g., zoom range, resolution), positions of cameras in the robotic system, and image resolution requirements for translation into product stocking data, etc. and set a distance of each waypoint from its corresponding shelving segment based on these data and image requirements.

For example, the system can: extract a height of a first shelving structure—represented in the normalized metaspace—from a first elevation map associated with the address of the first shelving structure; calculate a target lateral offset distance from the first shelving structure based on the height of the first shelving structure and optical capabilities of a camera (e.g., zoom, resolution) integrated into the robotic system; and then define a first subset of waypoints offset laterally from a longitudinal face of the first shelving structure by this target lateral offset distance. In another example, the system can locate a waypoint at a particular distance in front of a corresponding shelving segment that enables the two cameras offset vertically along the robotic system's mast to capture the full height of the shelving segment, accounting for positional accuracy of the robotic system (e.g., +/−4″ from a target waypoint location, +/−1° from a target yaw angle), while maximizing resolution of images captured by the two cameras. The system can thus write a position and orientation, such as in the form of a (x,y,∂) coordinate relative to the coordinate system, to a waypoint for each shelving segment labeled in the normalized metaspace.

In another implementation, for each virtual shelving segment labeled in the normalized metaspace, the system can define a virtual area centered in front of a shelving segment and for which the full height of the shelving segment will be within fields of view of cameras on one side of the robotic system when the robotic system is at any position within the area (while accounting for positional accuracy of the robotic system, such as described above). For the robotic system that includes a set of cameras on one side (e.g., the left side) of the mast and a second set of cameras on an opposing side (e.g., the right side) of the mast, as described above, the system can then detect two overlapping virtual areas corresponding to opposing shelving segments within the normalized metaspace, calculate the intersection of these two overlapping virtual areas, and compress the two corresponding waypoints to a single waypoint defining a (x,y,∂) coordinate—with the intersection—at which the two opposing shelving segments will be fully within the fields of view of cameras on both sides of the robotic system, as shown in FIG. 1. The system can thus compress two waypoints corresponding to two opposing shelving segments (i.e., two shelving segments facing each other across a common aisle) into a single waypoint centered laterally ad longitudinally between the two shelving segments. Therefore, for two opposing shelving structures separated by an aisle of width not greater than a maximum imaging distance for the height of the shelving structure, the system can generate a row of waypoints along the aisle, including one waypoint centered across the aisle and centered between ends of a shelving segment for each pair of opposing shelving segments along the aisle.

However, for shelving structures that are too tall and/or for aisles that are too wide to permit capture of images of shelving segments on both sides of the robotic system at one waypoint, the system can generate two rows of waypoints along the aisle, wherein each row of waypoints defines positions along the aisle at which the robotic system captures images of shelving segments within one adjacent shelving structure.

The system can thus generate a set of waypoints that define locations and orientations (e.g., a set of (x,y,∂) coordinates in the coordinate system for the store) for which each shelving segment in the store is fully in the field of view of at least one camera in the robotic system at least once when the robotic system navigates to each waypoint in the store during a imaging routine. Alternatively, the system can generate a set of waypoints for a subset of shelving segments within the store. For example, the system can label each virtual shelving structure or each virtual shelving segment in the normalized namespace with a category (e.g., cosmetics, boxed cereal, canned goods, detergent, loose produce, loose deli meats) and/or shelving type (e.g., pegboard, flat shelf, glass deli case, open basket for loose produce, etc.) stored in a corresponding planogram or product position database. In this example, the system can generate waypoints for shelving segments corresponding to cosmetics, boxed cereal, canned goods, and detergent categories and/or for shelving segments with pegboard-type and flat shelf-type labels, but the system can exclude waypoints for shelving segments corresponding to loose produce and loose deli meats and/or for shelving segments labeled for glass deli cases and open baskets for loose produce. However, the system can selectively generate waypoints for a subset of shelving segments (or a subset of shelving structures, shelves, etc.) within the store based on any other shelving segment category, type, or other parameter.

For each waypoint, the system can also write—to a waypoint—addresses of cameras in the robotic system that are to record images once the robotic system has navigated to a waypoint (e.g., navigated to within a threshold distance and angular offset from the (x,y,∂) coordinate defined by the waypoint), as shown in FIG. 1. For example, for a first waypoint at which the right side of the robotic system faces a shelving segment four feet in height but the left side of the robotic system does not face a nearby shelving segment, the robotic system can write an address for a lower-right camera in the robotic system to the first waypoint in order to trigger the lower-right camera to capture an image of the short shelving segment when the robotic system reaches the first waypoint. Similarly, for a second waypoint at which the right side of the robotic system faces a shelving segment seven feet in height but the left side of the robotic system does not face a nearby shelving segment, the robotic system can write an address for a lower-right camera and an address for an upper right camera in the robotic system to the second waypoint in order to trigger the lower-right camera and the upper-right camera in the robotic system to capture images of the tall shelving segment when the robotic system reaches the second waypoint. Furthermore, for a third waypoint at which the right side of the robotic system faces a first shelving segment seven feet in height and a left side of the robotic system faces a second shelving segment seven feet in height, the robotic system can write addresses for a lower-right camera, an upper-right camera, a lower-left camera, and an upper-left camera in the robotic system to the third waypoint in order to trigger the all four cameras in the robotic system to capture images of the two tall shelving segments when the robotic system reaches the third waypoint. However, the system can label a waypoint with an address of a camera according to any other parameter or schema.

The system can also associate each camera address in a waypoint with an addresses of a shelving structure, a shelving segment, a shelf, and/or a slot, etc. expected to be in a field of view of the corresponding camera when the robotic system is proximal the location and orientation—within the store—defined in the waypoint, as shown in FIG. 1. In one example, based on a physical position of a camera—addressed in a waypoint—on the remote controller, the location defined in the waypoint, the orientation defined in the waypoint, and labeled features contained in the normalized metaspace, the system can predict a shelving structure, a shelving segment, a shelf, and/or a slot, etc. that will be in the field of view of a camera once the robotic system has navigated to the waypoint. In this example, the system can then collect addresses of this shelving structure, shelving segment, shelf, and/or slot, etc. predicted to fall in the field of view of the camera from normalized metaspace and associate these addresses with the corresponding camera address in the waypoint. Thus, when the robotic system navigates to a waypoint and captures an image through a particular camera as specified in the waypoint, the robotic system can write the address of a shelving structure, shelving segment, shelf, and/or slot, etc.—associated with the address of the particular camera in the waypoint—to the image metadata, and the system can automatically match the image to a planogram, predict SKUs of products shown in the image, and select labeled template images to match to regions in the image based on these shelving structure, shelving segment, shelf, and/or slot addresses.

In the foregoing example, for each waypoint in the set of waypoints, the system can label the waypoint with an address of a particular shelving structure and a particular shelving segment predicted to fall within a field of view of the optical sensor when the robotic system occupies a location and an orientation defined by the waypoint in Block S160. During a subsequent imaging routine, the system can: receive a first image recorded by the robotic system while occupying a first waypoint, in the set of waypoints, adjacent a first shelving segment in the first shelving structure; access a first list of identifiers of products assigned to the first shelving segment based on a first address of the first shelving segment stored with the first waypoint; retrieve a first set of template images, from a database of template images, representing products in the first list of products stored with the first waypoint; and identifying products on shelves in the first shelving segment based on similarities between features detected in the first image and template images in the first set of template images, as described below, in Block S190.

The system can therefore generate a set of waypoints specific to motion and imaging specifications of a robotic system placed in the store, such as specific to positional precision locating capabilities of the robotic system, positions of cameras in the robotic system, zoom and resolution capabilities of cameras in the robotic system, etc. However, the system can implement any other method or technique: to define a location and orientation of one or more waypoints for the store; to specify one or more cameras on the robotic system to capture images at a waypoint; or to determine a shelving structure, a shelving segment, a shelf, and/or a slot, etc. within the field of view of a camera at a waypoint and to associate a callout for image capture by the camera with an address of this shelving structure, a shelving segment, a shelf, and/or a slot, etc.

11. Path Planning

Figure 5:
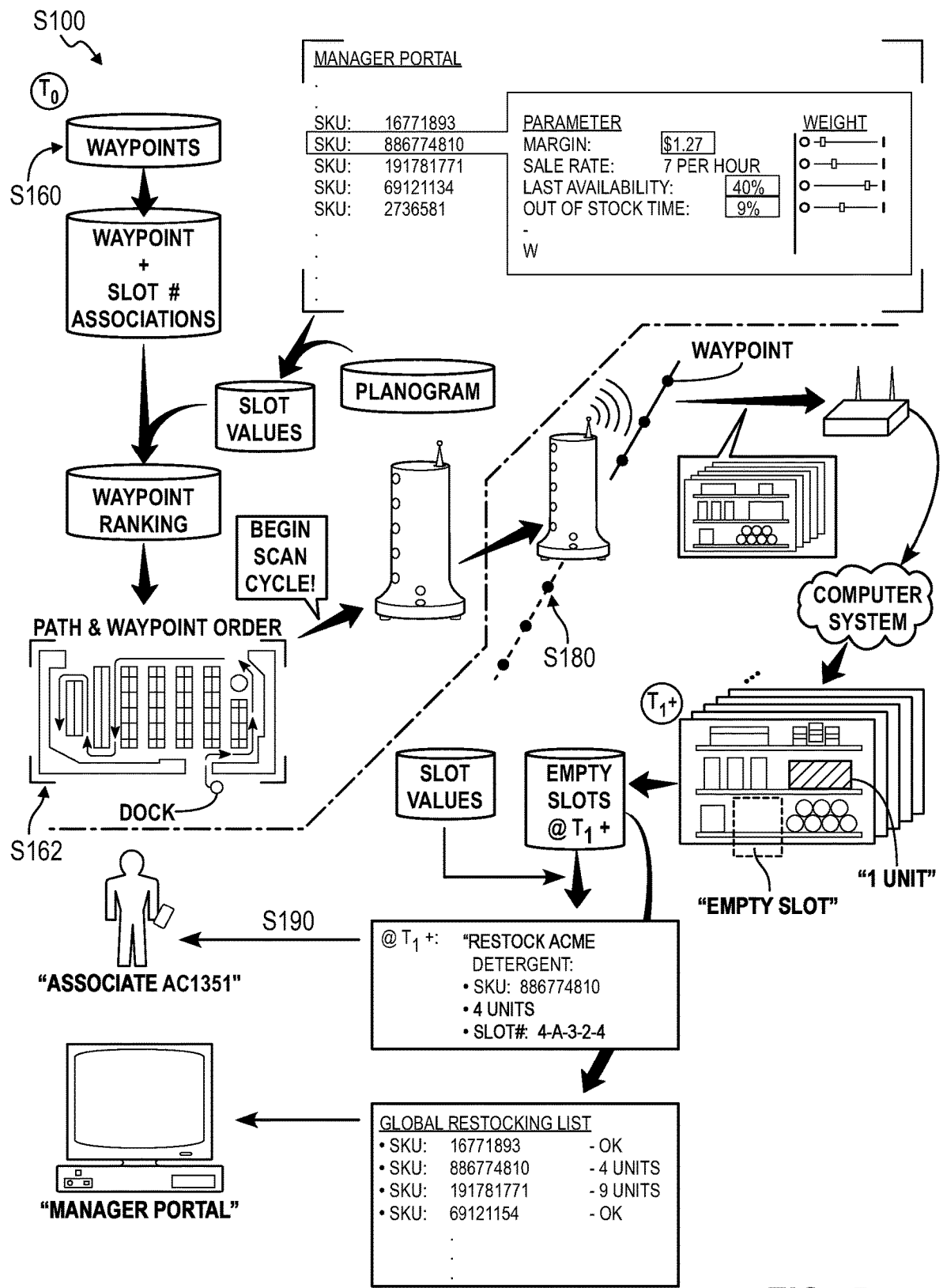
FIG. 5 is a flowchart representation of one variation of the method.

As shown in FIG. 5, one variation of the method S100 includes Block S162, which recites: defining an order for the set of waypoints based on product values of products assigned to slots, within the set of shelving structures, in fields of view of cameras integrated into the robotic system when occupying each waypoint in the set of waypoints; and serving the order for the set of waypoints to the robotic system for execution during the imaging routine. Generally, in Block S162, the system can define an order for waypoints defined in Block S160.

For example, the system can: calculate a linear combination of values of products assigned to a shelving segment by the planogram for each shelving segment in each shelving structure represented in the normalized metaspace; assign a value to a waypoint based on a linear combination of values of products assigned to a shelving segment adjacent the waypoint for each waypoint in the set of waypoints; and define an order for the set of waypoints based on values assigned to the set of waypoints in Block S162. In this example, the system can calculate the order for the set of waypoints: that minimizes total distance traversed by the robotic system from a docking station within the store, to a first waypoint adjacent a first shelving segment associated with a greatest linear combination of values of assigned products, to a second waypoint adjacent a second shelving segment associated with a lowest linear combination of values of assigned products, and back to the docking location; minimizes energy consumption by the robotic system during a next imaging routine; or achieves any other one or more weighted parameters, as described below. The system can then serve the set of waypoints and the order for the set of waypoints to the robotic system for execution during the imaging routine in Block S180.

11.1 Individual Waypoint Ranking

In this variation, the system can calculate a value of each waypoint in the store, rank these waypoints by value, and set an order for navigating through these waypoints accordingly, as shown in FIG. 5.

In one implementation, the system accesses a planogram and a map of the store (e.g., a map geo-referenced to the planogram) to calculate a total product value (described below) of products in the field of view of cameras integrated into the robotic system at each waypoint in the set of waypoints. For example, for a particular waypoint, the system can: identify the location of the particular waypoint within the planogram; project known fields of view of cameras integrated into the robotic system onto the planogram—based on an orientation of the robotic system specified in the waypoint and based on a distance from the waypoint to an adjacent shelving structure defined in the map of the store—to identify a set of slots (e.g., a set of slot addresses) on the shelving structure that may be captured in a set of images recorded by the robotic system occupying the waypoint; pass this set of slot addresses into the planogram to retrieve a set of SKUs assigned to these slots; and then associate this waypoint with one or more unique SKUs and a number of facings of each SKU in the field of view of the robotic system when occupying the particular waypoint in real space in an orientation defined by the waypoint. In this example, the system can repeat this process for each waypoint defined throughout the store in order to associate each waypoint with a unique set of SKUs and SKU facings. The system can store and implement these SKUs and SKU facings over a series of imaging routines; the system can also repeat this process each time the planogram is revised or each time a new planogram is activated for the store.

The system can then rank the set of waypoints by product values of SKUs associated with each waypoint. For example, for each SKU assigned to a slot in the current planogram, the system can calculate a "product value" (or "priority," or "weight") as a function of profitability (or "margin") associated with the SKU and the number of units of the SKU sold at the store per unit of time (e.g., per day). In this example, the system can calculate a product value of a particular SKU as a product of the margin and a sale rate of the SKU, that is:

[product value]=[margin]·[# units sold per day].

The system can then rank waypoints by greatest product value of a single SKU assigned to a slot in the field of view of the robotic system when occupying each waypoint. Alternatively, for each waypoint, the system can calculate an "aggregate product value" for a particular waypoint by summing product values of SKUs assigned to all discernible slots in the field of view of the robotic system when occupying the particular waypoint; the system can then rank waypoints by greatest aggregate product value.

In another implementation, the system can rank waypoints based on near real-time POS sales data. In this implementation, in preparation for (e.g., immediately before) dispatching the robotic system to execute a imaging routine in Block S110, the system can access sales data from a POS system installed in the store to identify a quantity of each SKU sold at the store over a preceding period of time, such as: within a five-minute, thirty-minute, one-hour, or eight-hour period leading up to the current time; since a last restocking period at the store; or since a last imaging routine completed by the robotic system. The system can then calculate a current product value for each SKU in the store based on a margin assigned to each SKU (e.g., written to remote memory by a regional manager through an administrator portal hosted by the system) and a real-time frequency of sales of the SKU, such as:

[product value]=[margin]·[# units sold since last imaging routine].

For each waypoint defined throughout the store, the system can thus recalculate an aggregate product value for a particular waypoint based on new product values representing recent sale frequencies of SKUs falling within the field of view of the robotic system when occupying the particular waypoint. The system can then rank or prioritize each waypoint accordingly.

In a similar implementation, the system can prioritize waypoints based on historical sales frequencies. For example, in preparation for dispatching the robotic system to execute a imaging routine in Block S110, the system can retrieve historical sale data for SKUs specified in a current planogram of the store, such as: sale data for a last day, week, month, quarter, or year; for a current day of the week, sale data from this same day of the week for the previous five weeks; for a current or upcoming holiday, sale data from the last instance of the same holiday or holiday season; for a rainy spring day, sale data from the last two instances of rainy spring days; etc. In this example, the system can: retrieve these sale data from a POS implemented by the store; or implement methods and techniques described below to extract these sale data from changes in numbers of product facings identified across images collected during past imaging routines. For each SKU, the system can then multiply a stored margin of a particular SKU by the historical number or frequency of sales of the particular SKU to calculate a new product value for the SKU; for each waypoint, the system can calculate a new aggregate product value, as described above. The system can then automatically re-rank waypoints throughout the store accordingly by aggregate product value.

11.2 Waypoint Ordering by Individual Waypoint Value

The system can then define an order in which the robotic system is to navigate through the set of waypoints during the upcoming imaging routine based on waypoint rankings.

In one implementation, the system orders the set of waypoints such that, when executed by the robotic system, the robotic system: navigates from a home location at a dock to a first waypoint associated with a greatest aggregate product value in the set; executes an imaging routine to capture a set of images at each other waypoint between the home location and the first waypoint; marks each of these other waypoints as completed; upon reaching the first waypoint, executes an imaging routine to capture a set of images at the first waypoint; and then marks the first waypoint as completed. In this implementation, the system orders the remaining set of waypoints such that, after collecting images at the first waypoint, the robotic system: navigates toward a second waypoint—associated with a greatest aggregate product value for the remaining set of waypoints—via a path that minimizes overlap with waypoints already completed; executes an imaging routine to capture a set of images at each other waypoint between first waypoint and the second waypoint; marks each of these other waypoints as completed; upon reaching the second waypoint, executes an imaging routine to capture a set of images at the second waypoint; and marks the second waypoint as completed; etc. until a set of images has been recorded at all waypoints defined for the store or until the imaging routine is terminated, as described below.

In another implementation, the system calculates an order for navigating through the set of waypoints that maximizes total product value of products imaged by the robotic system per distance traversed by the robotic system during a imaging routine.

In another implementation, the system: calculates a sum of product values of products assigned to slots within a field of view of the robotic system occupying a waypoint for each waypoint in the store; identifies a first subset of waypoints associated with sums of product values greater than a threshold product value; identifies a second subset of waypoints associated with sums of product values less than the threshold product value; and defines an order for the set of waypoints that specifies navigation to (and image capture at) each waypoint in the first subset of waypoints, followed by navigation to each waypoint in the second subset of waypoints, followed by navigation to each waypoint in the first subset of waypoints during the imaging routine. In this implementation, the system can separately order the first and second subsets of waypoints to achieve a shortest total distance traversed over the course of the imaging routine in light of the robotic system's start location within the store. Alternatively, the system can: calculate an order for the complete set of waypoints that minimizes overlap along the robotic system's trajectory; order the first subset of waypoints by aggregate product value at each waypoint, to maximize the product value of product images per unit time or per unit distance traversed by the robotic system, or to minimize overlap in the robotic system's trajectory, etc.; and then append the waypoint order for the complete set of waypoints with the ordered first subset of waypoints. For example, for a store defining an approximately rectangular floor plan with parallel rows of shelving structures, the system can: define a serpentine path up and down each aisle in sequence from a near end of the store to a far end of the store followed by (or preceded by) a loop around the perimeter of the store to capture images at all waypoints with minimum path overlap; calculate an order for the first subset of waypoints—associated with aggregate product values exceeding a threshold value—that minimizes a path traversed by the robotic system on its way back to its dock; and append the serpentine path with the ordered first subset of waypoints.

In Block S162, the system can thus select a subset of waypoints associated with aggregate product values exceeding a threshold value (or select a preset number of waypoints associated with the greatest product values in the set of waypoints) and define a trajectory for the robotic system that directs the robotic system to this subset of waypoints (at least) twice and to all other waypoints in the store (at least) once during a imaging routine.

11.3 Waypoint Order by Shelving Structure Priority

Alternatively, in this variation, the system can group waypoints and implement methods and techniques described above to set an order for navigating between groups of waypoints within the store during a imaging routine.

In one implementation, the system groups waypoints by row defined along the length of each shelving structure within the store. The system then: sums product values of products assigned to slots in a shelf segment for each shelving structure in the store (i.e., for each group of waypoints); prioritizes the set of shelving structures in order of product value sum; orders the groups of waypoints accordingly; and calculates a trajectory through the ordered groups of waypoints that minimizes the total distance traversed by the robotic system from waypoints defined along a first shelving structure associated with a greatest product value sum to waypoints defined along a last shelving structure associated with a lowest product value sum. Thus, when the robotic system is dispatched to execute a imaging routine in Block S110, the robotic system can: navigate to the first shelving structure and capture images at each waypoint in the first group of waypoints; then navigate to the second shelving structure and capture images at each waypoint in the second set of waypoints, even if the second shelving structure is substantially removed from the first shelving structure; etc. for each shelving structure in the store. In a similar implementation, the system can rank each shelving structure (e.g., each group of waypoints) by the greatest product value of a single SKU assigned to each shelving structure and order the groups of waypoints accordingly.

In another implementation, the system can calculate an order for navigating through groups of waypoints that maximizes the total product value of products imaged per unit time throughout a imaging routine. In one example: the sum of all product values of products assigned to slots along shelving structure 2 within the store is the greatest at 4389; the sum of all product values of products assigned to slots along shelving structure 1—facing shelving structure 2—is 1238; the sum of all product values of products assigned to shelving structure 18—near an opposite end of the store—is second greatest at 4285; the sum of all product values of products assigned to shelving structure 9—near an opposite end of the store—is 2831; and the robotic system is stationed nearest shelving structure 18. In this example, the system can set an order for navigating through waypoints in the store such that the robotic system first images shelving structure 18, . . . followed by shelving structure 9, . . . followed by shelving structure 2, and finally shelving structure 1, thereby maximizing the product value of products imaged by the robotic system per unit time throughout the imaging routine.

In the foregoing implementations, the system can implement methods and techniques described above to (re)calculate product values for SKUs arranged throughout the store. The system can also: identify select shelving structures containing singular high-value products (e.g., products associated with static or dynamic product values exceeding a threshold product value) or associated with total product values exceeding a threshold total product value; and define a trajectory for the robotic system that directs the robotic system along these select shelving structures (at least) twice and along all other shelving structures (at least) once during a imaging routine.

11.4 Waypoint Order by Scheduled Restocking Periods

In another implementation, the system orders waypoints based on scheduled restocking periods. For example, the system can: access a restocking schedule for each section (or "category") of the store (e.g., a spice section, a canned foods section, a laundry section, a carbonated beverage section, and a dairy section, etc.); identify a particular section of the store assigned an upcoming restocking period; retrieve a group of waypoints within this particular section; and generate a waypoint order that places the group of waypoints ahead of all other waypoints in the store for a next scan period. In this example, the system can also implement methods and techniques described above to order the group of waypoints corresponding to the particular section of the store and the remaining set of waypoints in the store, such as by ordering the group of waypoints and the remaining set of waypoints to minimize a total distance traversed by the robotic system over the imaging routine.

Alternatively, in preparation for a scheduled restocking period for the particular section of the store, the system can append an ordered list of waypoints—generated as described above—with a group of waypoints corresponding to the particular section of the store. During the imaging routine, the system can generate and serve real-time prompts to restock high-value slots in Block S140, as described below, based on image data collected during the imaging routine. Upon conclusion of the imaging routine, the system can generate a restocking list specific to the particular section of the store in Block S150 based on images recorded at the end of the imaging routine such that the section-specific restocking list is most current upon commencement of the restocking period for the particular section of the store.

The system can implement similar methods and techniques in response to receipt of manual confirmation of a restocking period for a particular section of the store, such as received through a manager portal, as described below.

11.5 Waypoint Order by Scheduled Delivery

In another implementation, the system can access a delivery schedule for the store and order waypoints for an upcoming imaging routine based on product scheduled for upcoming delivery. For example, the system can access a delivery schedule indicating that a carbonated beverage delivery vehicle is scheduled to make a delivery of carbonated beverages within one to two hours. The system can thus trigger the robotic system to execute a imaging routine in Block S110. In Block S162, the system can also serve an ordered set of waypoints to the robotic system, including: a first group of waypoints defined along a carbonated beverage aisle in the store; followed by a second group of discrete waypoints adjacent discrete carbonated beverage displays (e.g., refrigerators) arranged throughout the store; followed by waypoints for the remainder of the store. Upon conclusion of the first and second groups of waypoints, the system can generate a carbonated beverage restocking list for the carbonated beverage and discrete carbonated beverage displays throughout the store in Block S150 based on image data collected from the robotic system during the imaging routine thus executed by the robotic system; associates of the store (or a carbonated beverage representative delivering product to the store) can then access this carbonated beverage restocking list to restock these slots throughout the store immediately upon arrival of the delivery vehicle.

Alternatively, in preparation for a scheduled delivery of carbonated beverages, the system can append an ordered list of waypoints—generated as described above—with the first group of waypoints defined along a carbonated beverage aisle in the store followed by the second group of discrete waypoints adjacent discrete carbonated beverage displays arranged throughout the store. During the imaging routine, the system can generate and serve real-time prompts to restock high-value slots in Block S140, as described below, based on image data collected during the imaging routine. Upon conclusion of the imaging routine, the system can generate a carbonated beverage restocking list specific to slots assigned carbonated beverages in Block S150 based on images recorded at the end of the imaging routine such that the carbonated beverage restocking list is most current upon arrival of the carbonated beverage delivery vehicle.

11.6 Waypoint Order by Manual Selection

In yet another implementation, the system can: receive a selection of a region of interest within the store from a store manager, regional manager, or other associate of the store, such as through a manager portal; and then order waypoints for an upcoming imaging routine with waypoints in this region of interest preceding all other waypoints in the ordered set of waypoints for the store. The system can then implement methods and techniques described above to order these discrete groups of waypoints.

The system can thus store a set of waypoints for a store, wherein each waypoint designates capture of images of one or more shelves within the store, and define an order for the robotic system to navigate through this set of waypoints during a imaging routine. In preparation for an upcoming imaging routine, the system can then push definitions for these waypoints and an order for these waypoints to the robotic system, such as over a cellular network or through a computer network (e.g., the Internet), in Block S162. However, the system can maintain, update, and/or distribute waypoints including any other data or prompts in any other format to one or more robotic systems placed within a store at any other type, time, or frequency.

12. Imaging Routine

Block S180 of the method S100 recites uploading the set of waypoints to the robotic system for execution in a subsequent imaging routine. Generally, in Block S180, the system serves the set of waypoints generated in Block S160 (and the waypoint order defined in Block S162) to the robotic system. For example, the system transmits the set of waypoints to the robotic system over the Internet via a local wireless router installed in the store.

Along with the set of waypoints, the system can also upload a master map of the store to the robotic system, such as in the form of the real map generated from distance scans collected by the robotic system during an autonomous mapping routine, as described above, and labeled with the coordinate system for the store. During a subsequent imaging routine, the robotic system can sequentially navigate through the set of waypoints by: scanning its local environment with its integrated mapping sensor (e.g., a LIDAR sensor); compiling scans from the mapping sensor into a new map of the robotic system's environment; and determining its location within the store's coordinate system by comparing the new map to the master map—defining the coordinate system—of the store. The robotic system can thus navigate to a next waypoint by moving to a position and orientation within the store at which the output of the mapping sensor aligns—within a threshold distance and angle—with a region of the master map corresponding to the (x,y,∂) location and orientation defined in the waypoint. The robotic system can capture and tag images at the waypoint, as described above, before navigating to a next waypoint defined for the store. During or upon completion of the imaging routine, the robotic system can upload images to the system for processing, as described above.

During or upon completion of the imaging routine, the robotic system can also upload a new real map of the store (or raw scan data collected by the mapping sensor during the imaging routine) to the system. The system can then repeat Blocks of the method S100 to recalculate a set of waypoints for the store and to load this new set of waypoints onto the robotic system. Therefore, by selecting a latest architectural plan, standardized store layout, and/or set of elevation maps for the store following each imaging routine, the system can generate a current architectural metaspace with current shelving structure, shelving segment, shelf, and/or slot addresses for the store. Furthermore, by aligning the current architectural metaspace to the newest real map of the store, the system can compensate for any latest physical changes to the store's layout and generate a new set of waypoints for the store accordingly. However, the system can implement any other method or technique to update a set of waypoints for the store based on new data collected by the robotic system and to supply these waypoints and new real maps to the robotic system.

13. Product Identification and Restocking Prompts

Figure 4:
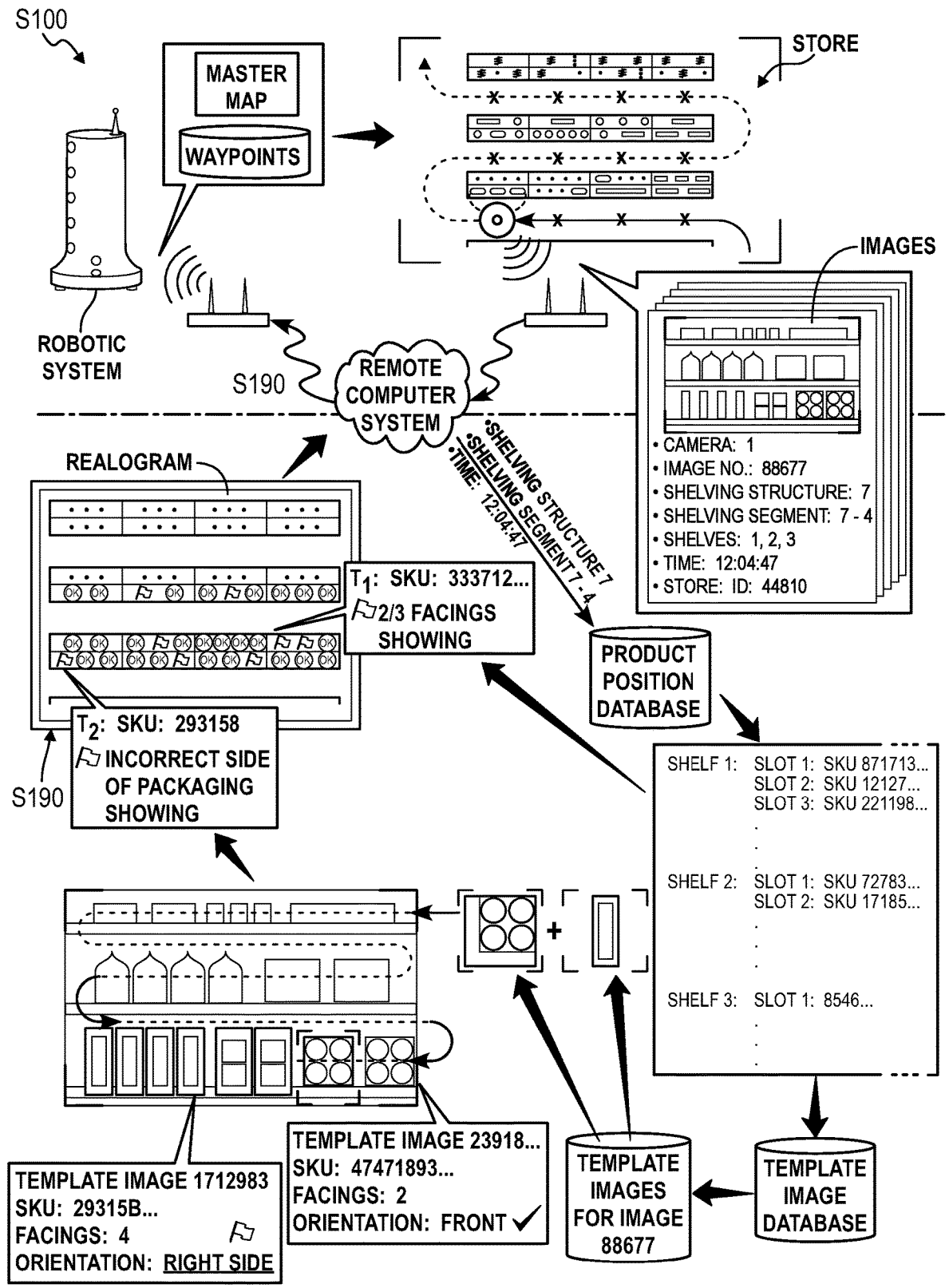
FIG. 4 is a flowchart representation of one variation of the method.

As shown in FIG. 4, the system can then: receive images (e.g., digital color photographic images) recorded by the robotic system during the imaging routine, such as in real-time, intermittently, or upon conclusion of the imaging routine; process these images to determine the stocking condition of the store; and issue notifications and/or a restocking list responsive to differences between stocking condition of the store and the planogram of the store in Block S190.

In one implementation, the system receives a first image recorded by a first camera in the robotic system while occupying a first waypoint—adjacent a first shelving segment in the first shelving structure—during the imaging routine. The system then implements methods and techniques described in U.S. patent application Ser. No. 15/600,527 to: detect a first shelf in the first image; determine an address of the first shelf based on a first address of a first shelving structure associated with the first waypoint and a vertical position of the first shelf within the first image; retrieve a first list of products assigned to the first shelf by the planogram based on the address of the first shelf; retrieve a first set of template images from a database of template images, wherein each template image in the first set of template images includes visual features of a product specified in the first list of products; extract a first set of features from a first region of the first image adjacent the first shelf; confirm presence of a unit of a first product—in the first list of products—on the first shelf in response to correlation between features in the first set of features and features in a first template image, in the first set of template images, representing the first product; determine that a unit of the first product is improperly stocked on the first shelf in response to deviation between features in the first set of features and features in the first template image; and generate a first restocking prompt for the first product on the first shelf in response to determining that the unit of the first product is improperly stocked on the first shelf in Block S190.

In the foregoing example, the system can also: project heights of a first set of shelves assigned to the first shelving segment by the first elevation map of the first shelving structure onto the first image based on a known position of the first camera on the robotic system and identify a first region in the image corresponding to a first shelf in the first shelving segment accordingly; or implement template matching, object recognition, or other methods or techniques to identify the first shelf in the first region of the first image. The system can then extract a first list of identifiers of products assigned to the first shelf by the first elevation map; retrieve a first set of template images, from a database of template images, representing products in the first list of products; and identify products on the first shelf based on similarities between features detected in the first region of the first image and template images in the first set of template images in Block S190.

The system can repeat this process for images of other shelving structures, shelving segments, shelves, etc. recorded by the robotic system while occupying other waypoints throughout the store during the imaging routine. The system can then aggregate presence, quantity, and/or locations or products detected in these images into a current stocking condition of the store (e.g., a "realogram") and provide these data to a manager or other associate of the store, such as through a manager or associate portal within a web browser or native application executing on a desktop computer or mobile computing device (e.g., a smartphone, a tablet). The system can also automatically compare the current stocking condition of the store to the planogram to detect differences, aggregate these differences into a list of restocking prompts (e.g., ordered according to values of products specified in these restocking prompts, and then serve these restocking prompts to associates of the store in order to guide manual restocking of the store, such as in real-time, during off-peak patron hours, or during store closure hours, as shown in FIG. 5 and such as described in U.S. patent application Ser. No. 15/347,689.

In this variation, when processing images recorded by the robotic system, the system can also extract shelf, shelving segment, shelving structure, and/or aisle addresses from shelf tags arranged on shelves, aisle signs arranged on shelving structures, etc. shown in these images. The system can then confirm addresses assigned to shelving structures in the normalized metaspace according to such addresses extracted from images recorded by the robotic system when occupying waypoints at known locations proximal these shelving structures within the store. For example, the system can: receive a first image recorded by the robotic system while occupying a first location during the mapping routine; scan the first image for a first aisle address; project the first aisle address onto the map based on the first location of the robotic system when the first image was recorded and a known position of the camera—integrated into the robotic system—that recorded the first image; and then confirm alignment of the architectural metaspace to the map of the store based on alignment between the first aisle address and addresses imported from the architectural metaspace into the normalized metaspace. However, the system can implement any other methods or techniques to automatically confirm alignment and detect deviation between the architectural metaspace to the map of the store.

14. Normalized Metaspace Variations

In one variation, the robotic system and the system cooperate to generate a normalized metaspace for the store without an existing architectural plan or standardized store layout for the store. In this variation, throughout an autonomous mapping routine, the robotic system intermittently captures images of shelving structures within the store. For example, the robotic system can implement simultaneous localization and mapping techniques to construct and update a map of the interior of the store and can simultaneously implement template matching, pattern matching, pattern recognition, and/or other techniques to identify aisles and shelving structures within the map. In this example, upon identification of an aisle, the robotic system can automatically navigate to a position proximal a lateral and longitudinal center of the aisle, reorient itself to align its integrated cameras to adjacent shelving structures, record an image at each camera, and then write a location and orientation of the robotic system within the map and an address of a corresponding camera to image metadata for each image thus recorded. The robotic system can repeat this process throughout the autonomous mapping routine to generate a map of the store and to collect images of various shelving structures within the store, and the robotic system can then return this map and images to the system. Alternatively, the robotic system can upload the real map to the system upon conclusion of the autonomous mapping routine; and the system can remotely and asynchronously identify aisles and shelving structures in the real map, as described above, and define one temporary waypoint including a (x,y,∂) coordinate adjacent each identified shelving structure, and then dispatch the robotic system on a reconnaissance routine to collect images at each temporary waypoint. However, the robotic system and the system can implement any other method or technique to collect a current real map of the store and images of current shelving structures in the store.

The system can then transform the real map into a vectorized line map of the store, define a coordinate system within the vectorized line map, and identify aisles, shelving structures, and/or shelving segments, etc. in the vectorized line map, as described above. The system can also locate images captured by the robotic system during the autonomous mapping routine (or during the reconnaissance routine) within the vectorized line map.

The system can then identify SKUs of products in the images and populate shelving structures identified in the vectorized line map with SKUs of products identified in images captured nearby. For example, the system can access a database of template images, wherein each template image in the database is tagged with a SKU or other identifier or descriptor of a product shown in the template image. In this example, the system can implement template matching techniques to match a template image—from the template image database—to a region in an image recorded during the autonomous mapping routine, and the system can then transfer a SKU from the matched template image to a shelving structure identified in the vectorized line map and proximal a location at which the image was captured.

In particular, the system can: identify a particular aisle occupied by the robotic system when the image was recorded based on an (x,y) coordinate stored in the image metadata; identify a particular shelving structure—of two shelving structures lining the particular aisle—shown in the image based on the address of the camera that recorded the image and the orientation (e.g., yaw) of the robotic system stored in the image metadata; and write the SKU stored with the matched template image to the particular shelving structure in the vectorized line map. The system can repeat this process for other products shown in the image in order to populate one shelving structure identified in the vectorized line map with SKUs of multiple products, such as multiple instances of the same SKU or multiple different SKUs. For example, the system can match regions in the image to labeled template and transfer SKUs from matched template images to the shelving structure shown in the vectorized line map until the first of three unique SKUs or a total of six SKUs are identified in the image. The system can duplicate this process for each other image captured by the robotic system during the autonomous mapping routine in order to populate the vectorized line map of the store with one or more SKUs per identified shelving structure.

The system can then retrieve a set of current planograms (or a current product position database) for the store, as described above, and can link a particular planogram to a particular shelving structure shown in the vectorized line map based on like SKUs represented in the planogram and tagged to the particular shelving structure. In particular, for a shelving structure tagged with one or more SKUs in the vectorized line map, the system can identify an elevation map—from the preexisting planogram of the store—designating the same set of SKUs. Similarly, the system can identify a planogram designating a greatest number of SKUs (or a threshold proportion of SKUs) tagged to the shelving structure shown in the vectorized line map, such as to accommodate possible misplaced products on the shelving structure at the time of the autonomous mapping routine. The system can then write an address of the matched planogram and/or a shelving structure address extracted from within the matched planogram to the virtual shelving structure in the vectorized line map.

The system can then implement methods and techniques described above to delineate shelving segments in the virtual shelving structure based on positions of shelving segments shown in the planogram and to write shelving segment, shelf, and/or slot addresses, etc.—stored in the matched planogram—to the shelving structure shown in the vectorized line map. The system can also duplicate this process for other shelving structures identified in the vectorized line map and transform the resulting labeled line map into a normalized metaspace. However, the system can implement any other method or technique to generate a normalized metaspace.

1.5. Manual Waypoints

Furthermore, the system can append a set of waypoints automatically calculated for the store, as described above, with waypoints entered manually by a user or based on data entered manually by the user. For example, following installation of a temporary display within the store, an employee of the store can access the operator portal at a computer, tablet or smartphone, open the normalized metaspace, select a point within the normalized metaspace corresponding to the current location of the temporary display, and enter height, width, and identification data for the temporary display. In this example, the system can then calculate a location and orientation for a new waypoint, define a camera address for the waypoint, and write identification data for the temporary display to the waypoint before uploading the new waypoint to the robotic system. However, the system can implement any other method or technique to generate a waypoint based on user-supplied information.

16. Real-Time Waypoints and Temporary Shelving Structures

As shown in FIG. 6, one variation of the system includes Block S164, which includes, at the robotic system, during the imaging routine: detecting a matrix barcode in a field of view of a second optical sensor in the robotic system; calculating a temporary waypoint based on a position and an orientation of the matrix barcode in the field of view of the second optical sensor, the temporary waypoint defining a first location and a first orientation that aligns a field of view of the optical sensor to a temporary shelving structure coupled to the matrix barcode; recording a first image through the optical sensor while occupying the temporary waypoint. Block S164 also includes: determining an identity of the temporary shelving structure based on the matrix barcode; based on the identity of the temporary shelving structure, retrieving a first list of products assigned to the temporary shelving by a planogram of the store; retrieving a first set of template images from a database of template images, each template image in the first set of template images including visual features of a product specified in the first list of products; confirming presence of a unit of a first product, in the first list of products, on the temporary shelving structure in response to correlation between features in the first image and features in a first template image, in the first set of template images, representing the first product; determining that a unit of a second product is improperly stocked on the temporary shelving structure in response to deviation between features in the first image and features in a second template image, in the first set of template images, representing the second product; and, in response to determining that the unit of the second product is improperly stocked on the temporary shelving structure, generating a first restocking prompt for the second product on the temporary shelving structure.

Generally, in Block S164, the system defines a temporary waypoint automatically and in real-time when a temporary shelving structure is detected by the robotic system during an imaging routine; the robotic system can then navigate to this temporary waypoint and record an image, which the system can then process to determine a stocking condition of the temporary shelving structure. In one implementation, the robotic system can include a 2D or 3D depth sensor and a 2D or 3D forward-facing camera directedly outwardly from its front. During an imaging routine, the robotic system can regularly scan a field ahead of the robotic system through the depth sensor and camera, map surfaces nearby based on these scan data, and localize itself (e.g., relative to the normalized metaspace or a past map of the floor) based on locations of surfaces nearby, thereby enabling the robotic system to navigate from waypoint to waypoint with a high locational and rotational accuracy. However, during the imaging cycle, the system can also scan images recorded through the forward-facing camera for matrix barcodes (e.g., quick-response code, one-dimensional barcodes, etc.) or other optical identifiers. When a matrix barcode is detected, the robotic system (or the remote computer system) can scan a local or remote directory, such as a name mapping system, for an identifier of this matrix barcode; if the directory returns an identifier indicating that the matrix barcode is attached to or is otherwise associated with a temporary shelving structure—such as a freestanding cardboard popup configured to store units of one or more products associated with a particular brand—the system can execute Block S164 to define and execute a temporary waypoint adjacent the temporary shelving structure.

In the foregoing implementation, the robotic system (or the remote computer system) determines that the matrix barcode detected in an image recorded by the forward-facing camera is associated with a temporary shelving structure, the robotic system retrieves information related to the temporary shelving structure and associated with the matrix barcode, such as a height of the temporary shelving structure and the position of the matrix barcode on the temporary shelving structure relative to a front face of the temporary shelving structure from a remote temporary shelving structure database. The robotic system can then calculate a location and an orientation of a temporary waypoint that, when occupied by the robotic system, centers the front face of the temporary shelving structure in a field of view of a side-facing color camera on a side of the mast of the robotic system and at a preset target offset distance between the side-facing color camera and the front face of the temporary shelving structure, such as based on: these data collected from the temporary shelving structure database; the location of the robotic system within the store at the time the matrix barcode was detected; the position, orientation, and skew of the matrix barcode in the field of view of the forward-facing camera; intrinsic and extrinsic properties of the forward-facing camera; and the present target offset distance or target offset distance range for the side-facing camera, as described above. For example, the robotic system can: calculate a position and an orientation of a front face of the temporary shelving structure relative to the coordinate system based on the position and the orientation of the matrix barcode in the field of view of the second optical sensor and a position and an orientation of the robotic system relative to the coordinate system; and apply a target imaging distance, for the side-facing camera, from the front face of the temporary shelving structure to calculate the temporary waypoint.

The robotic system can queue the temporary waypoint for subsequent execution, execute waypoints between its current location and the touch sensor, and repeat the foregoing methods during subsequent scans of the forward-facing camera to further confirm the location and orientation of the temporary shelving structure and to further refine the location and orientation of the temporary waypoint. The robotic system can also confirm the presence, location, and orientation of the temporary shelving structure based on data collected by the 2D or 3D depth sensor, such as based on alignment between data collected by the 2D or 3D depth sensor and a location and orientation of the temporary shelving structure predicted by the robotic system based on the matrix barcode detected in images recorded by the forward-facing camera and a size and geometry of the temporary shelving structure associated with the matrix barcode.

Once the presence of the temporary shelving structure is confirmed, the temporary waypoint is thus calculated, and the temporary waypoint is thus occupied by the robotic system, the robotic system can record an image of the temporary shelving structure through the side-facing camera.

The system (e.g., the robotic system locally or the computer system remotely) can then process this image of the temporary shelving structure. For example, the system can: access a list of products assigned to the temporary shelving structure, such as by a planogram uniquely associated with the temporary shelving structure through the matrix barcode; retrieve a set of template images of products in this list; and then compare these template images to regions in the image to determine a current stocking condition of the temporary shelving structure, including a quantity of facings of these products occupying the temporary shelving structure, as in Block S190 described above and in U.S. patent application Ser. No. 15/600,527.

By then comparing the current stocking condition of the temporary shelving structure to the planogram uniquely associated with the temporary shelving structure, the system can identify deviations at the temporary shelving structure from its target stocking condition defined by the planogram and then generate a temporary restocking list accordingly. In particular, the system can generate a temporary restocking list for the temporary shelving structure based on deviations between units (or facings) of products detected on the temporary shelving structure shown in the image recorded by the robotic system at the temporary waypoint and the planogram associated with the temporary shelving structure. Based on the planogram of the temporary shelving structure and/or the planogram of the store and the location of the temporary shelving structure determined by the robotic system during the imaging routine, the system can also: determine whether the temporary shelving structure is properly oriented in the store, such as whether the front face of the temporary shelving structure is facing into its adjacent aisle or tipped on its side; and generate a prompt to reorient or relocate the temporary shelving structure accordingly.

The system can then serve the temporary restocking list and/or the prompt to reorient or relocate the temporary shelving structure to an affiliate of the temporary shelving structure, such by serving the temporary restocking list and/or the prompt to a local representative or local restocking agency outside of the store in real-time via an electronic notification or through a user portal. In this variation, the system can: serve this temporary restocking list and/or the prompt for the temporary shelving structure to an affiliate of the temporary shelving structure outside of the store; while also generating a global restocking list for other (more permanent or immutable) shelving structures arranged in the store and transmitting this global restocking list to a manager or other associate of the store, as described above.

However, the system (e.g., the robotic system and/or the remote computer system) can implement any other methods or techniques to detect, image, and monitor a temporary shelving structure arranged in the store substantially in real-time or asynchronously during an imaging routine in Block S164.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for automatically mapping a store comprising:

accessing a map of a floor space within the store generated based on map data collected by a robotic system while navigating through the store during a mapping routine;

accessing an architectural plan defining target locations of a set of shelving structures within the store;

distorting features in the architectural plan into alignment with like features in the map to generate a normalized metaspace representing real locations of the set of shelving structures;

identifying the set of shelving structures within the normalized metaspace based on target locations of the set of shelving structures defined in the architectural plan and distorted into alignment with like features in the map;

defining a route along the set of shelving structures identified within the normalized metaspace, the route comprising a first route segment along a first shelving structure, in the set of shelving structures, represented in the normalized metaspace; and dispatching the robotic system to scan shelving structures in the set of shelving structures in the store while traversing the route during a scan cycle succeeding the mapping routine.

2. The method of claim 1, further comprising:

accessing a second map of the floor space of the store generated by the robotic system while navigating along the route during the scan cycle;

accessing a set of images recorded by the robotic system while navigating through the store during the scan cycle, each image in the set of images associated with a position, along the route, occupied by the robotic system during recordation of the image during the scan cycle;

for each image in the set of images:
  detecting a shelving structure, in the set of shelving structures, depicted in the image based on a position, along the route, associated with the image;
  detecting a set of features in the image;
  identifying a set of products located on the shelving structure based on the set of features; and generating a stock condition of the shelving structure based on the set of products; and aggregating stock conditions of the set of shelving structures into a realogram of the store.

3. The method of claim 2, further comprising:
detecting a difference between a planogram of the store and the realogram; and
generating a restocking prompt to restock a particular shelving structure in the set of shelving structures with a particular product based on the difference; and
serving the restocking prompt to a computing device affiliated with an associate of the store.

4. The method of claim 1:
further comprising dispatching the robotic system to autonomously collect map data of the floor space within the store during the mapping routine in response to receipt of confirmation of a change to a shelving structure layout within the store;
wherein generating the normalized metaspace comprises generating the normalized metaspace representing the change to the shelving structure layout within the store; and
wherein defining the route comprises defining the set of route segments according to the change to the shelving structure layout represented in the normalized metaspace.

5. A method for automatically mapping shelving structures within a store comprising:
accessing a map of a floor space of the store generated based on map data collected by a robotic system while navigating through the store during a scan cycle;
accessing a set of images recorded by the robotic system during the scan cycle;
detecting a set of shelving structures represented in the map;
for each image in the set of images:
  detecting a shelving structure, in the set of shelving structures, depicted in the image based on a location within the map associated with the image;
  detecting a set of features in the image;
  identifying a set of products located on the shelving structure based on the set of features; and
  generating a stock condition of the shelving structure based on the set of products;
aggregating stock conditions of the set of shelving structures into a realogram of the store representing locations of the set of shelving structures and products throughout the store during the scan cycle; and
in response to receipt of confirmation of a preferred stock state of the store during the scan cycle, storing the realogram as a planogram defining target stock conditions of shelving structures and products throughout the store.

6. The method of claim 5, further comprising:
accessing a second set of images recorded by the robotic system during a second scan cycle succeeding the scan cycle;
for each image in the second set of images:
  detecting a shelving structure, in the set of shelving structures, depicted in the image;
  detecting a set of features in the image;
  identifying a set of products located on the shelving structure during the second scan cycle based on the set of features; and
  generating a second stock condition of the shelving structure during the second scan cycle based on the set of products;
aggregating stock conditions of the set of shelving structures into a second realogram of the store representing locations of the set of shelving structures and products throughout the store during the second scan cycle;
detecting a difference between the planogram and the second realogram;
generating a restocking prompt to restock a particular shelving structure in the set of shelving structures with a particular product based on the difference; and
serving the restocking prompt to a computing device affiliated with an associate of the store.

7. The method of claim 5, further comprising:
dispatching the robotic system to execute a second scan cycle, succeeding the scan cycle, within the store;
accessing a first image comprising visual data recorded by the robotic system during the second scan cycle, the first image associated with a first location and a first orientation of the robotic system within the store;
detecting a first shelf represented proximal a first region of the first image;
identifying an address of the first shelf based on the first location, the first orientation, and a vertical position of the first shelf within the first image;
based on the address of the first shelf, retrieving a first list of products associated with the first shelf by the planogram;
retrieving a first set of template images from a database of template images, each template image in the first set of template images comprising visual features of a product specified in the first list of products;
extracting a first set of features from the first region of the first image;
detecting an understock condition of a first product, in the first list of products, on the first shelf in response to deviation between features in the first set of features and features in a first template image, in the first set of template images, representing the first product; and
in response to detecting the understock condition of the first product on the first shelf, generating a first restocking prompt for the first shelf.

8. The method of claim 5, further comprising, for each image in the set of images:
scanning the image for an aisle address; and
projecting the aisle address onto the map based on a location within the map associated with the image.

9. The method of claim 5, further comprising:
dispatching the robotic system to execute the scan cycle in the store;
at the robotic system, during the scan cycle:
  navigating autonomously along a set of aisles within the store;
  constructing the map of the floor space of the store; and
  intermittently recording photographic images while navigating along aisles in the store; and
for each sequence of photographic images recorded by the robotic system while autonomously navigating along an aisle, in the set of aisles, in the store:
  compiling the sequence of photographic images into an image of a shelving structure, in the set of shelving structures, facing the aisle.

10. The method of claim 5, further comprising:
at a first time, dispatching the robotic system to execute a first scan cycle segment, in the scan cycle, in the store;
at the robotic system, during the first scan cycle segment:
  navigating autonomously along a set of aisles within the store; and constructing an initial map of the floor space of the store;
detecting the set of shelving structures in the initial map;
defining a set of waypoints adjacent the set of shelving structures, each waypoint defining a coordinate and an orientation that locates a section of a shelving structure, in the set of shelving structures, in a field of view of a camera in the robotic system when occupied by the robotic system;
at a second time succeeding the first time, dispatching the robotic system to execute a second scan cycle segment, in the scan cycle, in the store; and
at the robotic system, during the second scan cycle segment:
sequentially navigating to waypoints in the set of waypoints within the store;
constructing the map of the floor space of the store; and
recording an image in the set of images at each waypoint in the set of waypoints.

11. The method of claim 10:
further comprising:
accessing an architectural metaspace defining target locations of the set of shelving structures within the store; and
distorting features in the architectural metaspace into alignment with like features in the initial map to generate a normalized metaspace representing real locations and addresses of the set of shelving structures in the store; and
wherein defining the set of waypoints comprises:
defining a coordinate system within the normalized metaspace; and
defining the set of waypoints within the normalized metaspace, each waypoint in the set of waypoints defining an orientation relative to the coordinate system based on a known position of the camera in the robotic system and a real location of the first shelving structure represented in the normalized metaspace.

12. The method of claim 5, wherein detecting a shelving structure depicted in an image, detecting a set of features in the image, identifying a set of products located on the shelving structure, and generating a stock condition of the shelving structure for each image in the set of images comprises, for a first image in the set of images:
detecting a set of features in the first image;
detecting an aisle address, applied to a first shelving structure in the set of shelving structures, in the first image;
determining an identity of the first shelving structure based on the aisle address;
based on the identity of the first shelving structure, retrieving a first list of products assigned to the first shelving structure;
retrieving a first set of template images from a database of template images, each template image in the first set of template images depicting a product in the first list of products;
confirming presence of a unit of a first product, in the first list of products, on the first shelving structure based on correlation between features in the first set of features detected in the first image and features in a first template image, in the first set of template images, depicting the first product; and
generating a first stock condition, of the first shelving structure, indicating presence of the unit of the first product on the first shelving structure.

13. The method of claim 5, wherein detecting a shelving structure depicted in an image, detecting a set of features in the image, identifying a set of products located on the shelving structure, and generating a stock condition of the shelving structure for each image in the set of images comprises, for a first image in the set of images:
detecting a set of features in the first image;
detecting an optical identifier, applied to a first shelving structure in the set of shelving structures, in the first image;
based on the optical identifier, identifying a first product assigned to the first shelving structure;
retrieving a first set of template images from a database of template images, each template image in the first set of template images representing the first product;
confirming presence of a unit of the first product on the first shelving structure based on correlation between features in the first set of features detected in the first image and features in a first template image, in the first set of template images, representing the first product; and
generating a first stock condition, of the first shelving structure, indicating presence of the unit of the first product on the first shelving structure.

14. The method of claim 13, wherein detecting the optical identifier in the first image comprises detecting the optical identifier comprising a matrix barcode in the first image.

15. The method of claim 5:
further comprising, during the scan cycle at the robotic system:
compiling map data into the map;
scanning a field around the robotic system for shelving structures; and
in response to detecting a shelving structure, in the set of shelving structures, proximal the robotic system while occupying an aisle in the store:
navigating to a position proximal a lateral and longitudinal center of the aisle;
aligning a camera arranged on the robotic system to face the shelving structure;
triggering the camera to record an image, in the set of images; and
writing a location and orientation of the robotic system, within the map, to image metadata for the image; and
wherein aggregating stock conditions of the set of shelving structures into the realogram of the store comprises aggregating stock conditions of the set of shelving structures into the realogram of the store based on locations and orientations of the robotic system, within the map, during recordation of the set of images.

16. The method of claim 5, further comprising:
accessing a second set of images recorded by the robotic system during a second scan cycle succeeding the scan cycle;
for each image in the second set of images:
detecting a shelving structure, in the set of shelving structures, depicted in the image;
detecting a set of features in the image;
identifying a set of products located on the shelving structure during the second scan cycle based on the set of features; and
generating a second stock condition of the shelving structure during the second scan cycle based on the set of products;
aggregating second stock conditions of the set of shelving structures into a second realogram of the store representing locations of the set of shelving structures and products throughout the store during the second scan cycle; and in response to receipt of confirmation of a second preferred stock state of the store during the second scan cycle, storing the second realogram as the planogram in place of the realogram.

17. A method for automatically mapping shelving structures within a store comprising:

accessing a map of a floor space of the store, the map representing locations of a set of fixed shelving structures within the store;

accessing a set of images recorded by a robotic system while navigating through the store, each image in the set of images associated with a location within the map corresponding to a position of the robotic system during recordation of the image;

for a first image in the set of images:
- detecting a first set of features in the first image;
- detecting a first optical identifier, applied to a first shelving structure in a set of fixed shelving structures present in the store, in the first image;
- based on the first optical identifier, identifying a first product assigned to the first shelving structure;
- retrieving a first set of template images from a database of template images, each template image in the first set of template images representing the first product;
- confirming presence of a first unit of the first product on the first shelving structure based on correlation between features in the first set of features detected in the first image and features in a first template image, in the set of template images, representing the first product; and
- generating a first stock condition, of the first shelving structure, indicating presence of the first unit of the first product on the first shelving structure; and for a second image in the set of images:
- detecting a second set of features in the second image;
- detecting a second optical identifier, applied to a second shelving structure, in the second image;
- identifying the second shelving structure as a temporary mobile inventory structure based on a position of the second shelving structure represented in the map;
- based on the second optical identifier, identifying a second product assigned to the second shelving structure;
- retrieving a second set of template images from the database of template images, each template image in the second set of template images representing the second product;
- confirming presence of a second unit of the second product on the second shelving structure based on correlation between features in the second set of features detected in the image and features in a second template image, in the second set of template images, representing the second product; and
- generating a second stock condition, of the second shelving structure, indicating presence of the second unit of the second product on the second shelving structure; and aggregating stock conditions of the first shelving structure and the second shelving structure into a realogram of the store.

18. The method of claim 17, wherein detecting the first optical identifier in the first image comprises detecting the first optical identifier comprising a matrix barcode in the first image.

19. The method of claim 17:

wherein identifying the second shelving structure as the temporary mobile inventory structure comprises identifying the second shelving structure as the temporary mobile inventory structure in response to the second shelving structure occupying an aisle in the store.

20. The method of claim 17, further comprising:

detecting a difference between a planogram of the store and the realogram;

generating a restocking prompt to restock a particular shelving structure in the set of fixed shelving structures with a particular product based on the difference; and serving the restocking prompt to a computing device affiliated with an associate of the store.

* * * * *